United States Patent [15] 3,643,227

Smith et al. [45] Feb. 15, 1972

[54] JOB FLOW AND MULTIPROCESSOR OPERATION CONTROL SYSTEM

[72] Inventors: William R. Smith, Mountain View; Rex Rice, Menlo Park, both of Calif.

[73] Assignee: Fairchild Camera and Instrument Corporation, Mountain View, Calif.

[22] Filed: Sept. 15, 1969

[21] Appl. No.: 858,000

[52] U.S. Cl. ....................340/172.5

[51] Int. Cl. ....................G06f 9/19, G06f 15/16

[58] Field of Search ....................235/157; 340/172.5

[56] References Cited

UNITED STATES PATENTS

| | | | |
|---|---|---|---|
| Re. 26,171 | 3/1967 | Falkoff | 340/172.5 |
| 3,348,210 | 10/1967 | Ochsner | 340/172.5 |
| 3,349,375 | 10/1967 | Seeber et al. | 340/172.5 |
| 3,411,139 | 11/1968 | Lynch et al. | 340/172.5 |
| 3,421,150 | 1/1969 | Quosig et al. | 340/172.5 |
| 3,444,525 | 5/1969 | Barlow et al. | 340/172.5 |
| 3,449,722 | 6/1969 | Tucker | 340/172.5 |
| 3,487,375 | 12/1969 | Macon et al. | 340/172.5 |
| 3,496,551 | 2/1970 | Driscoll et al. | 340/172.5 |

*Primary Examiner*—Gareth D. Shaw
*Assistant Examiner*—Melvin B. Chapnick
*Attorney*—Roger S. Borovoy and Alan H. MacPherson

[57] ABSTRACT

A hardware-oriented control system for use in a time-shared multiprocessor system is disclosed. The system controls the processing or flow of each requested processing operation or job, which typically requires the performance of processing tasks of several different processors. The control system also controls the operation of each processor by monitoring it and assigning a job thereto when the processor is found to be idle. The control system includes logic hardware necessary to form and modify a queue for each processor type, the queue including, by means of the contents of fields of special-purpose control words, all the jobs requiring the processing task of its associated processor type. The control system includes special-purpose clockable hardware which automatically responds to a signal from any processor which finished its task for a job previously assigned thereto, and modifies the processor's queue as well as adds, under defined conditions, the previously assigned job to the queue or queues of one or more other processors, whose processing tasks are required in the job's performance. The control system further includes special-purpose clockable hardware to assign a job to each idle or nonbusy processor from its respective queue.

16 Claims, 38 Drawing Figures

WILLIAM R. SMITH
REX RICE
INVENTORS

BY Roger L. Borovoy
Alan H. MacPherson
ATTORNEYS

INVENTORS
WILLIAM R. SMITH
REX RICE
BY [signature]
[signature]
ATTORNEYS

TYPICAL TIME SEQUENCE FOR 3 PROCESSORS & 5 TERMINALS

| TIME PERIOD | COMPLETION | JC 3 CYCLE MODE OF OPERAT^N | RESULTING QUEUES Q2 | Q3 | Qn | RESULTING PROCESSOR STATES P2 | P3 | Pn |
|---|---|---|---|---|---|---|---|---|
| t0 | — | — | J1<br>J2<br>J3<br>J4<br>J5 | EMPTY | EMPTY | J1 | IDLE | IDLE |
| t1 | P2(Q3, BOT) | DELETE J1 FROM Q2<br>ADD J1 TO Q3<br>ASSIGN J2 TO P2<br>ASSIGN J1 TO P3 | J2<br>J3<br>J4<br>J5 | J1 | EMPTY | J2 | J1 | IDLE |
| t2 | P2(Q3, BOT) | DELETE J2 FROM Q2<br>ADD J2 TO BOTTOM OF Q3<br>ASSIGN J3 TO P2 | J3<br>J4<br>J5 | J1<br>J2 | EMPTY | J3 | J1 | IDLE |
| t3 | P2(Q3, TOP) | DELETE J3 FROM Q2<br>ADD J3 TO TOP OF Q3<br>ASSIGN J4 TO P2 | J4<br>J5 | J3<br>J1<br>J2 | EMPTY | J4 | J1 | IDLE |
| t4 | P3(Qn, TOP) | DELETE J1 FROM Q3<br>ADD J1 TO Qn<br>ASSIGN J3 TO P3<br>ASSIGN J1 TO Pn | J4<br>J5 | J3<br>J2 | J1 | J4 | J3 | J1 |
| t5 | Pn(Q2, TOP) | DELETE J1 FROM Qn<br>ADD J1 TO Q2, TOP | J1<br>J4<br>J5 | J3<br>J2 | EMPTY | J4 | J3 | IDLE |
| t6 | P3(Q2, TOP) | DELETE J3 FROM Q3<br>ADD J3 TO Q2, TOP<br>ASSIGN J2 TO P3 | J3<br>J1<br>J4<br>J5 | J2 | EMPTY | J4 | J2 | IDLE |
| t7 | P2(Q2, BOT) | DELETE J4 FROM Q2<br>RE-ADD J4 TO Q2, BOT<br>ASSIGN J3 TO P2 | J3<br>J1<br>J5<br>J4 | J2 | EMPTY | J3 | J2 | IDLE |
| t8 | P3(Q3, BOT) | DELETE J2 FROM Q3<br>RE-ADD J2 TO Q3<br>RE-ASSIGN J2 TO P3 | J3<br>J1<br>J5<br>J4 | J2 | EMPTY | J3 | J2 | IDLE |

Fig. 4

WILLIAM R. SMITH
REX RICE
INVENTORS
BY [signature] [signature]
ATTORNEYS

WILLIAM R. SMITH
REX RICE
INVENTORS
BY
ATTORNEYS

INVENTORS
WILLIAM R. SMITH
REX RICE
BY [signature]
Alan H. MacPherson
ATTORNEYS

WILLIAM R. SMITH
REX RICE
INVENTORS
BY Alan H. MacPherson
ATTORNEYS

INVENTORS
WILLIAM R. SMITH
REX RICE
BY Roger L. Borovoy
Alan H. MacPherson
ATTORNEYS INVENTORS
WILLIAM R. SMITH
REX RICE
BY [signature]
[signature]
ATTORNEYS

WILLIAM R. SMITH
REX RICE
INVENTORS

BY Roger L Bowery
Alan H. MacPherson

ATTORNEYS

WILLIAM R. SMITH
REX RICE
INVENTORS
BY
ATTORNEYS

WILLIAM R. SMITH
REX RICE
INVENTORS
BY
ATTORNEYS

INVENTORS
WILLIAM R. SMITH
REX RICE
BY Loyal Bowery
Alan H. MacPherson
ATTORNEYS INVENTORS
WILLIAM R. SMITH
REX RICE
BY [signatures]
ATTORNEYS INVENTORS
WILLIAM R. SMITH
REX RICE
BY Loyd Bowers
Alan H. MacPherson
ATTORNEYS WILLIAM R. SMITH
REX RICE
INVENTORS
BY Roger L Bowry
Alan H. MacPherson
ATTORNEYS

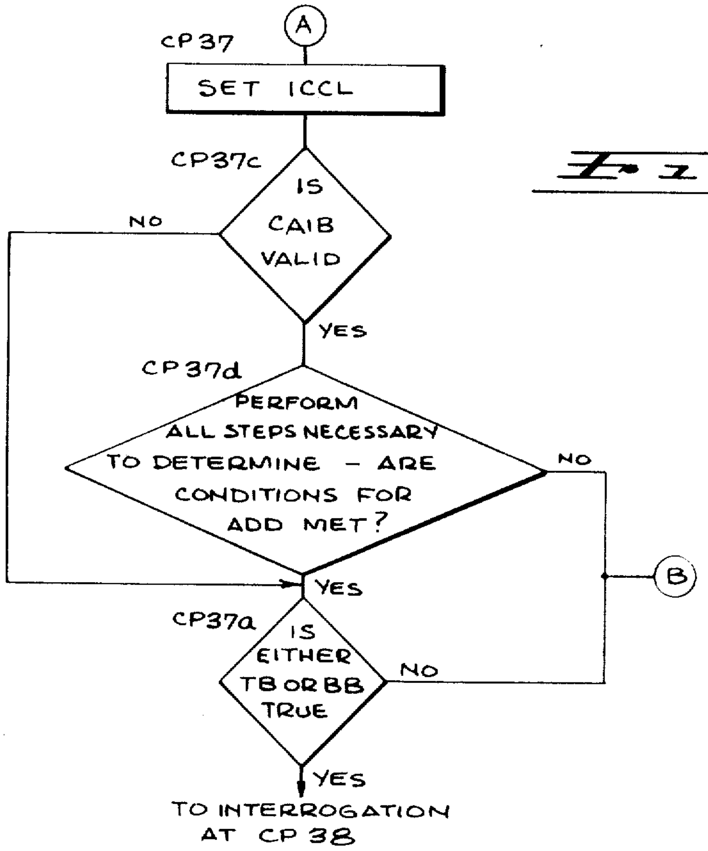

Fig. 27

| | | | Q2 | Q3 | Qn | P2 | P3 | Pn |
|---|---|---|---|---|---|---|---|---|
| t9 | P2 (Q3, TOP; Qn, TOP) | DELETE J3 FROM Q2<br>ADD J3 TO Q3<br>ADD J3 TO Qn<br>ASSIGN J1 TO P2<br>ASSIGN J3 TO Pn | J1<br>J5<br>J4 | J3<br>J2 | J3 | J1 | J2 | J3 |
| t10 | P3 (Qn, BOT) | DELETE J2 FROM Q3<br>ADD J2 TO Qn<br>ASSIGN J3 TO Qn | J1<br>J5<br>J4 | J3 | J3<br>J2 | J1 | J3 | J3 |
| t11 | P3 (Q2, BOT, IF Pn TASK DONE) | DELETE J3 FROM Q3 | J1<br>J5<br>J4 | EMPTY | J3<br>J2 | J1 | IDLE | J3 |
| t12 | Pn (Q2, BOT, IF P3 TASK DONE) | DELETE J3 FROM Qn<br>ADD J3 TO Q2<br>ASSIGN J2 TO Pn | J1<br>J5<br>J4<br>J3 | EMPTY | J2 | J1 | IDLE | J2 |

Fig. 28

INVENTORS
WILLIAM R. SMITH
REX RICE
BY Roger L. Bowry
Alan H. MacPherson
ATTORNEYS

WILLIAM R. SMITH
REX RICE
INVENTOR.
BY
ATTORNEYS

Fig. 31

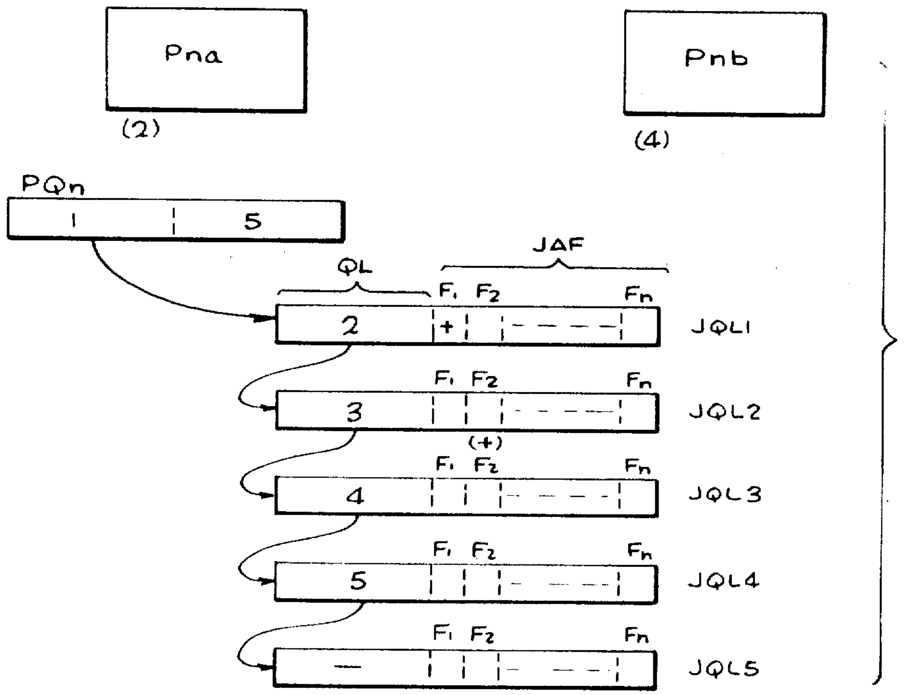

| | | | Q2 | Q3 | Qn | P2 | P3 | Pna | Pnb |
|---|---|---|---|---|---|---|---|---|---|
| t13 | | | J3<br>J1<br>J5<br>J4 | J2 | EMPTY | J3 | J2 | IDLE | IDLE |
| t14 | P2(Qn,TOP) | DELETE J3 FROM Q2<br>ADD J3 TO Qn<br>ASSIGN J1 TO P2<br>ASSIGN J3 TO Pna | J1<br>J5<br>J4 | J2 | J3 | J1 | J2 | J3 | IDLE |
| t15 | P2(Qn,TOP) | DELETE J1 FROM Q2<br>ADD J1 TO Qn TOP<br>ASSIGN J1 TO Pnb<br>ASSIGN J5 TO P2 | J5<br>J4 | J2 | J1<br>J3 | J5 | J2 | J3 | J1 |
| t16 | P2(Qn,BOT) | DELETE J5 FROM Q2<br>ADD J5 TO Qn<br>ASSIGN J4 TO P2 | J4 | J2 | J1<br>J3<br>J5 | J4 | J2 | J3 | J1 |
| t17 | Pna(Q3,BOT) | DELETE J3 FROM Qn<br>ADD J3 TO Q3<br>ASSIGN J5 TO Pna | J4 | J2<br>J3 | J1<br>J5 | J4 | J2 | J5 | J1 |

Fig. 32

INVENTORS
WILLIAM R. SMITH
REX RICE
BY [signature]
[signature]
ATTORNEYS

INVENTORS
WILLIAM R. SMITH
REX RICE
BY [signature]
[signature]
ATTORNEYS

WILLIAM R. SMITH
REX RICE
INVENTORS
BY
ATTORNEYS

JOB FLOW AND MULTIPROCESSOR OPERATION CONTROL SYSTEM

BACKGROUND OF THE INVENTION

1. Field of the Invention

The present invention relates to improvements in a time-shared multiprocessor system and, more particularly, to a control system for use in a time-shared multiprocessor system to control the execution of requested processing operations, each one of which may involve processing by several of the system's processors, which are of different types, and which may include several processors of the same type.

2. Description of the Prior Art

The significant increase in computer usage has led to the development of time-shared multiprocessor systems. As defined herein, such a system is assumed to comprise a plurality of different types of processors which are controllable to perform requested processing operations. Each processing operation may involve the use of the processing of one or more of the different processor types. Each requested processing operation, which may be defined as a job, may be received from any one of a plurality of users or sources which the system is designed to service. Time-sharing is accomplished by operating the system so that the various processors thereof simultaneously execute their processing tasks for different jobs which require their services.

It is appreciated by those familiar with such a system that disregarding the processing performance of each processor, the performance efficiency of the system as a whole is dependent on the manner in which jobs flow through the system, and on the manner in which each processor is supplied with jobs to perform its processing task thereon. Alternately stated, the system's efficiency depends on the manner in which each job is assigned to the various processors, whose services the job requires, and on the manner in which each processor is sequentially assigned various jobs to perform its processing task therefor.

Herebefore, various queuing techniques have been proposed to control the flow of each job in a time-shared multiprocessor system. These techniques employ special-purpose programs, hereafter also referred to as queuing programs, which are written in machine language or at least executed in machine language to form and modify queues for the various processors. The queue of each processor may include all the jobs requiring the processor's performance, as part of their execution. As is the case with any other computer program, the execution of any of these special-purpose programs involves the use of normal instruction counters, instruction registers, addressing and index registers and other related circuits which are needed to retrieve each instruction word, determine its content and control the system's operation in accordance therewith.

The complexities and lengths, and therefore, the execution time of these queuing programs are directly related to the desired flexibility with which the queues are either formed and/or modified. Since for efficient job flow, a high degree of flexibility of queue formation and/or modification is desirable, the execution of a queuing program is very time consuming which significantly reduces the overall performance efficiency of the system. Also, a long program includes more instruction words. Therefore, a larger portion of the system's memory must be devoted for storing the longer programs, which is a marked disadvantage. Thus, a need exists for a new technique and/or a system for controlling the flow of jobs in a time-shared multiprocessor system.

From the point of view of each job in the system, a need exists for an improved technique and/or means to control the job's flow in the system by assigning the job to the various processors which are needed for its execution in a most flexible manner, yet one which requires a minimum of time so as to enable the job to be performed by the system in optimum time. When viewed from each processor's point of view, a need exists for a new technique and/or means to control the formation of the professor's queue, and the sequential assignments of jobs to the processors from its queue in optimum time, so as to minimize the processor's idle time as long as there are jobs in the system which require the processor's processing task.

OBJECTS AND SUMMARY OF THE INVENTION

It is a primary object of the present invention to provide a new control system for controlling the flow of jobs, and the assignment of jobs to a plurality of processors in a time-shared multiprocessor system.

Another object of the present invention is to provide a new control system for use in a time-shared multiprocessor system to control the flow of jobs therein, without resort to special-purpose queue-forming programs.

A further object of the present invention is to provide a control system for use in a time-shared multiprocessor system to control the formation of a queue for each processor type, without resort to special-purpose queue-forming programs.

A further object of the present invention is to provide a control system for use in a time-shared multiprocessor system by means of which queues, related to the various processors, are formed and modified in optimum time without resort to special-purpose queue-forming programs.

Still another object of the present invention is to provide a system for controlling the flow of each job in a time-shared multiprocessor system by adding each job to the queues of the various processors, whose processing tasks are required for the job execution, in optimum time.

A further object of the present invention is to provide a novel control system for use in a time-shared multiprocessor system to control the sequential assignment of jobs to each processor from a queue related thereto in optimum time, without resort to special-purpose programs.

These and other objects of the present invention are achieved by incorporating, in a time-shared multiprocessor system, a hardware-oriented control system, which, without resort to special-purpose programs, forms and modifies queues, associated with the various processors. The control system uses these queues to control the flow of each job in the system, and the sequential assignment of jobs to each processor from its associated queue. The control system, hereafter also referred to as the Job Controller or JC, has access to a Random Accessible Memory (RAM) in which control words are located at selected addressable cells. The JC utilizes these control words to form a separate queue for each processor or processor type, as the case may be. The JC includes all the hardware necessary to respond to each requested job and add the job to the queue of the first processor which has to perform its task as part of executing the job. The JC further includes all the hardware necessary to assign a job to each idle processor from the processor's queue.

In accordance with the teachings of the present invention, it is assumed that when a processor completes the performance of its task for a job, previously assigned thereto, it provides the JC with a Needs Service signal indicating the processor's availability to receive another job from its queue. It is further assumed, that each processor, upon completing the performance of its task for a job further supplies the JC with the number of the next processor to which the job should be transferred for subsequent task performance. The novel JC of the present invention includes hardware which responds to a Needs Service from any processor, and in case of simultaneous request for servicing by two processors, from the processor of higher priority, to initiate a three-cycle mode of operation.

During one describe hereafter referred to as the Delete cycle, the JC by means of its hardware automatically deletes the queue of the (*a*) processor the job previously assigned thereto, Completion Code Register queue without deleting the job number, depending on the particular signals received from the serviced processor, as will be described hereafter in detail. During the second cycle, hereafter referred to as the Add cycle, the JC's hardware is automatically utilized to add the job, previously assigned to the serviced processor, to at least one queue of one processor which is to perform its task on the particular job. As will be described hereafter in detail, in different embodiments of the JC, hardware is incorporated to control the addition of the job number only if particular designated conditions are met. The JC further includes hardware which responds to received signals to control the addition of a job to a queue.

During the third cycle of operation, hereafter referred to as the Assign Job cycle, each of the processors in the system is interrogated to determine its operation status. For each processor which is found to be idle, or not busy, the processor's queue is utilized to determine the first assignable job therein, which is then assigned to the processor.

In each of the embodiments of the JC of the present invention, which will be described hereafter in detail, the hardware which is necessary for the three-cycle mode of operation is incorporated. The hardware which is of the clockable type performs the three-cycle mode of operation without resort to multiinstruction word programs. Thus, the need for such programs and the requirement for providing valuable memory storage capacity for storing them are eliminated. Furthermore, the formation, modification and assignment of jobs to the various processors is performable at clock cycle speed, rather than in response to the contents of instruction words where retrieval from memory is time consuming, thereby greatly reducing the time required for controlling the flow of jobs in the system and the assignment of jobs to the various processors, as compared with the time required in prior art systems.

As defined herein, the operation of the control system at clock cycle speeds intends to imply that the control system once activated to perform its three-cycle mode of operation, responds to clocking signals or pulses, supplied thereto at a high frequency or rate from an appropriate conventional type clock, and automatically executes each of the cycles without resort to any instruction words of special-purpose control programs.

The novel features of the invention are set forth with particularity in the appended claims. The invention will best be understood from the following description when read in conjunction with the accompanying drawings.

BRIEF DESCRIPTION OF THE DRAWINGS

FIG. 4 is a multicolumn chart which is used to define nine successive time periods during which the system is assumed to be operating on jobs with processors;

FIG. 14 is a simplified block diagram of a typical processor and a typical processor controller, associated therewith;

FIG. 27 is a partial flow chart of another embodiment of the Add cycle of operation;

FIG. 28 is a chart representing the operation of the Job Controller during a sequence of four time periods, $t9$–$t12$;

FIG. 31 is a simplified format diagram of a queue common to several processors of the same type;

FIG. 32 is another chart useful in explaining another embodiment of the invention.

DESCRIPTION OF THE PREFERRED EMBODIMENTS

Figure 1:
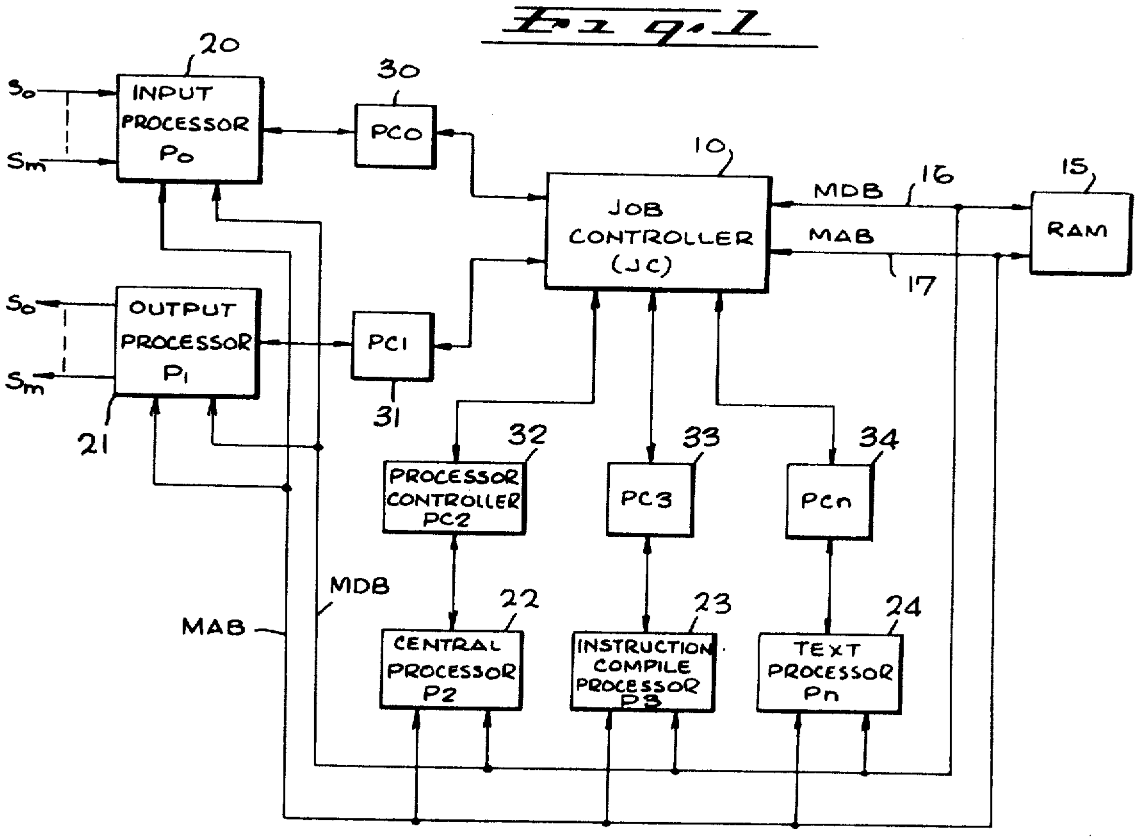
FIG. 1 is a general block diagram of a time-shared multiprocessor system, used to highlight the environment in which the present invention is incorporated.

Referring to FIG. 1, there is shown in block form a time-shared multiprocessor system which is presented in order to highlight the system environment in which the present invention is incorporated. The system is time-shared in that it is assumed to be capable of simultaneous performance of processing operations for a plurality of processing requesting sources. It is of the multiprocessor type in that it incorporates a plurality of processors which generally perform different processing operations, several or all of which may be involved in the execution of a complete processing operation, requested by any one of the sources. It is the basic function of the instant invention to coact with the processors so that the various processing operations which are requested, are executed in as efficient a manner as possible.

Let each request for the execution of a processing operation from any source be defined as a request for the performance of a job, and the processing operation of each processor be defined as a task. Each job may, therefore, be thought of as a multitask job, since its execution may, and generally does, involve processing by more than one processor. Before a source can request the performance of a job, it has to supply the system with data on which the job is to be performed as well as sufficient information or data to define fully the requested job. Such data is assumed to be supplied to the system in the form of multibit data words, where each bit is a binary digit being either a binary one or a zero. The binary one may be represented by a relatively positive electrical signal or level, also referred to as a true level, and a binary zero by a relatively negative electrical signal or level, also referred to as a false level.

The data words, received from each source, may be assumed to be of two types, including operand words and instruction words. As defined in the present application, an operand word is a word which is used in the processing operation or which results from such an operation, while an instruction word is a word which together with other instruction words define the job to be performed.

The time-shared multiprocessor system shown in FIG. 1 is assumed to be capable of storing data words received from a plurality of sources, receiving requests for the performance of jobs from such sources, and controlling its plurality of processors to perform, simultaneously, different tasks on data words used in the performance of different jobs. Once each job is completed the processed data is returned to the job requesting source. The instant invention is incorporated in the system to control the assignments of tasks to and between processors in order to optimize the system's performance in executing the requests from the various job requesting sources. As seen from FIG. 1, the instant invention comprises a job controller 10, which together with a plurality of process controllers coacts with a random accessible memory or RAM 15 and a plurality of processors, designated PO–P*n*, which represent the time-shared multiprocessor system. For explanatory purposes, only five processors designated by blocks 20–24 are shown in FIG. 1. However, the instant invention may be incorporated in a system including any number of processors. The actual function or processing operation performed by each of the processors is indicated by the legend appearing in its respective block.

As shown, processors PI–P*n* represent an Input Processor, an Output Processor, a Central Processor, an Instruction Compile Processor and a Text Processor. Briefly stated, processors PO and P1 serve as the system's Input-Output (I/O) unit through which data words are received from the various sources designated, SO–S*m* as well as requests for the performance of jobs on such data words. Through the same unit, processed data words at the end of the completion of a job, are supplied to the sources which initially requested the job. Processor P0, being the Input Processor, performs the input functions of such a unit, while processor P1, representing the Output Processor performs the output functions of such a unit.

For explanatory purposes, it is assumed that the data words from each source which may request the performance of a job, are supplied through P0 for temporary storage in RAM 15. P0 assigns a number to the job which the source supplies to the system, via P0, upon requesting that the job be performed. As part of the request to perform the numbered job the source is assumed to supply the system with the number of the first processor which is to perform its task in executing the job. The job number is used by the system to identify the job until it is completed. Hereafter, the terms Job Number and Job may be used interchangably. When the job is completed the processed data is supplied to the requesting source, via the Output Processor P1.

Except for the operations of processor P0 and P1, which hereafter will be explained in conjunction with the instant invention, in order to relate the manner in which a request for the performance of a job is initiated, as well as the manner in which a completed job is returned to the requesting source, the actual processing operations or functions of the other processors, incorporated in the system are not material to a full understanding of the instant invention, and therefore, their operations will not be detailed. However, in order to indicate that the system incorporates processors capable of performing different tasks, processors P2, P3 and P*n*, shown in FIG. 1, are designated as performing different tasks. As will be pointed out hereafter, the instant invention may be used in a time-shared multiprocessor system in which are incorporated several identical processors, which would be the case if the task, performable by such processors, has to be performed at a rate greater than that capable of being fulfilled by a single processor. However, for the present explanation, it will be assumed, that each of the processors in the system performs a different function or task.

As seen from FIG. 1, the JC 10 and each of the processors are directly connected to the RAM 15 via a memory data bus (MDB) 16 and a memory address bus (MAB) 17. These busses are used to enable the JC to communicate with the RAM, i.e., to store words therein and receive words therefrom. The RAM 15 represents any conventional Random-Accessible Memory of the type which includes a memory matrix (MM) in which words are stored at different addressable storage locations or cells, a memory address register (MAR) and a memory data register (MDR). It also includes related control circuitry, necessary to control the RAM to operate in a Write cycle, in which a word in the MDR is stored in the cell whose address is in the MAR or a Read cycle during which a word stored in the cell whose address is in the MAR is read out and transferred to the MDR. Since RAM's are well known in the art, RAM 15 will not be described in any further detail except for a simplified matrix format which is necessary to explain the instant invention. Hereafter the address of a cell in which a word is stored may be referred to as the word address rather than the cell address.

As seen from FIG. 1, the JC 10 is connected to each processor through its respective processor controller (PC). The controllers for the five processors shown in FIG. 1 are represented by blocks 30–34. As used in the instant invention, each PC serves as an input-output unit for its respective processor as related to signals received from or supplied to the JC 10. It is these signals which are used in the instant invention to control the operation of each processor, as will be described hereafter in great detail. Each PC may be thought of as forming part of the novel JC 10. However, in order to simplify the following explanation and description of the instant invention, the PC's are shown as separate units external to the JC 10.

Before proceeding to describe the manner in which the JC 10 and the various PC's operate to control the performance of the various processors and special-purpose logic circuitry, or hardware, incorporated in the JC and the various PC's, their basic function will first be summarized. Briefly, the function of the instant invention is to control the assignment of tasks to the various processors to process simultaneously the various multitask jobs requested of the system by various sources. This, the JC accomplishes by controlling the task flow for each job among the various processors which are involved in the execution of the particular job. The JC also controls the order of tasks which each processor is to perform by sequentially assigning jobs thereto.

The novel JC 10 of the present invention includes special-purpose hardware, to be described hereafter in great detail, which enable it to perform its functions at clock cycle or high speed without having to access special-purpose programs to define its operation. The JC's hardware is designed to control task flow for each job among the various processors, and the sequential assignment of tasks to each processor by forming and modifying queues for the various processors. The queues are formed by means of special-purpose control words which are assumed to be storable in the RAM 15 to which the JC has access by means of busses MDB and MAB.

Briefly, the JC operates on these control words to form a separate queue for each of the processors, except for the input processor P0, which does not require a queue. At each point in time the queue of each processor includes the numbers of all the jobs which are requested of the system and which at the particular point in time need the processor's services in their execution. Since at any given time each processor is assumed to be able to perform its task for only one job, the processor's queue is used to list the jobs awaiting its services. Each queue is used by the JC to assign sequentially jobs to its processor for task execution. When the processor completes the execution of a task for any job, the number of that job is deleted from the processor's queue and a new job number is supplied to the processor. Thus the processor's queue is used to sequentially assign the tasks to its processor for sequential execution, thereby enabling the processor to sequentially perform tasks for different jobs requested of the system.

In accordance with the teachings of the present invention, when a processor completes the performing of a task for a given job, it indicates the next processor which is to perform a processing operation or task on the same job. This indication hereafter referred to as a Completion Code (CC) is supplied to the JC via the processor's PC. The JC then uses the CC and adds the number of the particular job to the queue of the next processor which is required to take part in the job execution. Thus the JC, by adding job numbers to the queues of the various processors controls the task flow for each job among the various processors.

Figure 2:
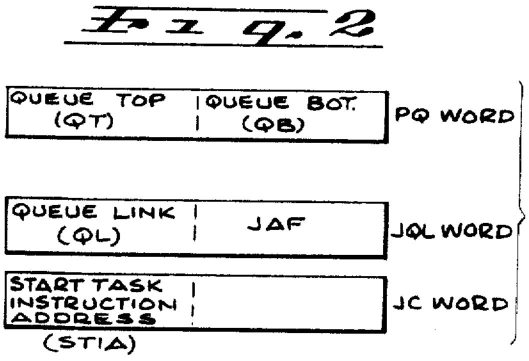
FIG. 2 is a diagram of formats of several types of control words, including a processor queue word and a job queue link word, which form a basic part of the invention.

Queue formations by means of the control words may best be explained by referring first to FIG. 2 wherein the formats of several types of control words including a processor queue (PQ) word and a job queue link (JQL) word are diagrammed. In accordance with the teachings of the present invention, it is assumed that RAM 15 includes cells in which these control words are stored. A separate PQ word is available for each processor while a separate JQL word is available for each requested job. Each PQ word includes two fields, a queue top (QT) field and a queue bottom (QB) field, while each JQL word includes at least a queue link (QL) field. The rest of the JQL words may be thought of as representing a field of various code flags. In various embodiments of the invention to be described hereafter this field is designated JAF and is assumed to contain flags which define the assignability of the job associated with the JQL word. The flags are designated F1 through F*n*. However at this point in the description this field will not be described in further detail. Each of fields QT, QB and QL is assumed to be of sufficient bit length to be able to store the largest possible job number. Assuming that each job number may be represented in binary form by a *k*-bit pattern, each of fields QT, QB and QL need be *k*-bit long.

As will be appreciated from the following description, the various PQ and JQL words are stored in cells whose addresses can be generated by address generations in the JC as a function of the numbers of the various processors or jobs. That is the address of the PQ word of any processor may be generated by using the processor's number while the number of any job may be used to generate the address of the job's JQL word. The number of any of the processor's may be assumed to be represented in binary form by a *x*-bit pattern.

The QT field of the PQ word of a processor is used to store the number of the job at the top of the queue while the QB field stores the number of the job at the bottom of the processor's queue. The QL field of the JQL word of any number job which is in the queue of any processor is used to store the number of another job in the same queue. This aspect of the invention may better be explained in conjunction with FIG. 3 which is used to diagram an exemplary queue of one of the processors, such as the Central processor, P2, and the various JQL words which form part of the queue. In the particular example, it is assumed that the queue of P2 includes the job numbers J2, J3, J5, J8 and J10. The JQL words of these five jobs are also diagrammed in FIG. 3.

Figure 3:
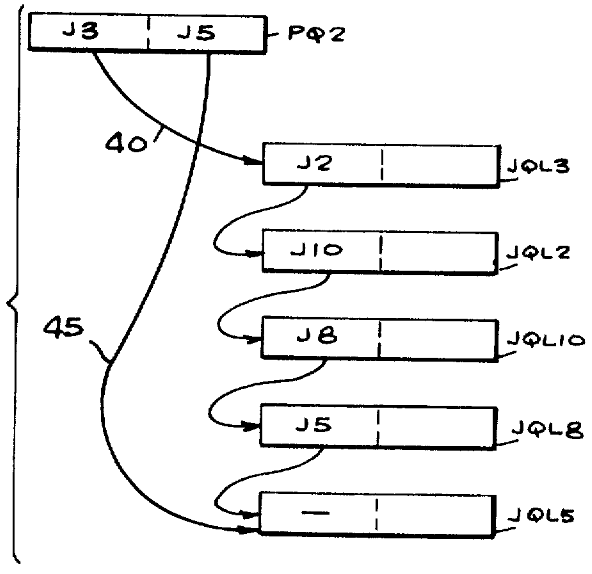
FIG. 3 is a diagram of an exemplary queue of one of the processors, and the various JQL words which form part of the queue.

Such a queue indicates that each of the five jobs requires the processing services of P2. For explanatory purposes it is assumed that the top job in the queue is J3. Consequently its number is stored in the QT field of PQ2 while the number of job J5 assumed to be at the bottom of the queue is stored in the QB field. For explanatory purposes, it is assumed that jobs J2, J10 and J8 form part of the queue from top to bottom as shown in FIG. 3. The JQL word of the top job J3, i.e., JQL3, is used to store the number of a succeeding job, i.e., J2 in its QL field while the JQL2 of job J2 is used to store the job number (J10) of the job following it in the queue, i.e., J10. Likewise, JQL10 and JQL8, respectively store the numbers of jobs succeeding them in the queue. It should be pointed out that since job J5 is the last one or at the bottom of the queue, its JQL word (JQL5) does not store any job number.

It should be appreciated that the queue of any processor includes only the numbers of the jobs which require the particular processor's service in their execution. It should further be pointed out that the order of the jobs in the queues is not a function of their numbers but rather depends on the order in which the jobs are added to the queue.

In accordance with the teachings of the instant invention the JC, in performing its functions, operates on the PQ and JQL words of the various processors and jobs. It forms the queues for the various processors and modifies them by either deleting JQL words therefrom or by adding such words thereto. A JQL word of a particular job is deleted from the queue of a processor when the processor completes its task for the particular job. On the other hand, when a job needs the service of a particular processor, the job's JQL word is added to the particular processor's queue. The job number may be added either to the top of the queue or to the bottom thereof as will be explained hereafter in detail.

Queue formation and modification is performed by the hardware of the JC 10 which, as will be pointed out hereafter in detail, includes address generators and a plurality of working registers. The hardware is used to address appropriate control words in the RAM 15, retrieve them and temporarily store them in the working registers. Thereafter, the JC operates on the various control words by modifying the content of their various fields to produce the proper linkages between the various control words. For example, as seen from FIG. 3*a*, a job J9 may be added to the top of the queue of P2 by inserting in the QL field of JQL9 the number J3 previously present in the QT field of PQ2 (see FIG. 3) and thereafter inserting in the latter-mentioned field (QT) the number J9 associated with the added job.

Figures 3A, 3B, 3C, 3D:
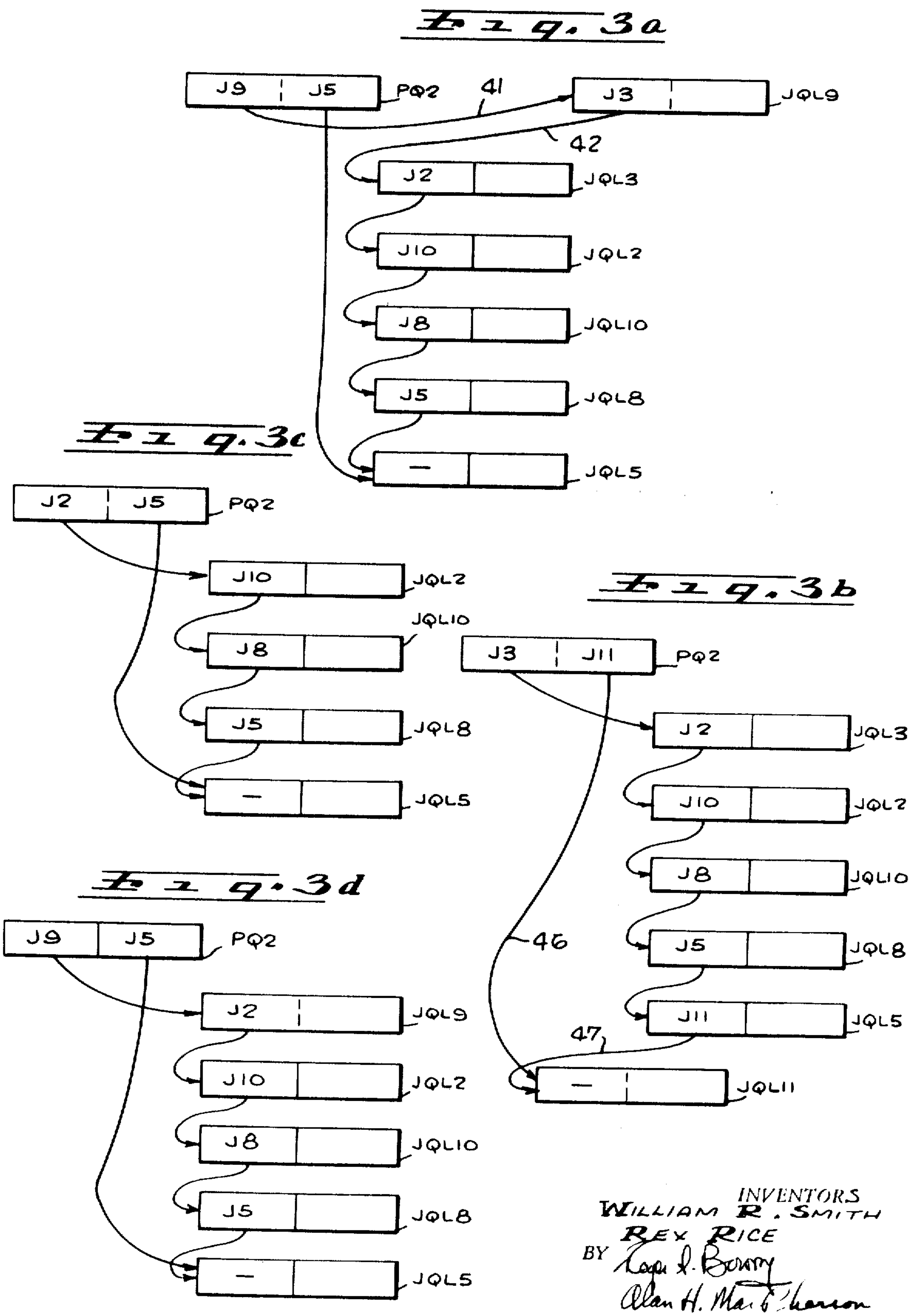
FIGS. 3*a*–3*d* are diagrams useful in explaining the addition or deletion of a job to the queue.
Figure 5:
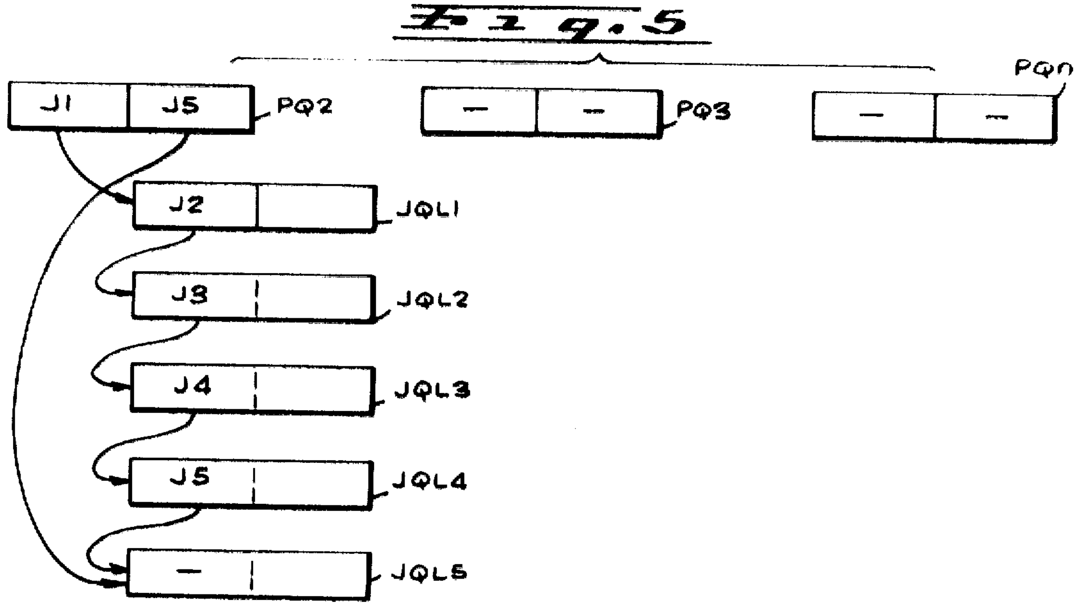
FIGS. 5–12 represent diagrams of three queues of the three processors during the various time periods shown in FIG. 4.
Figure 6:
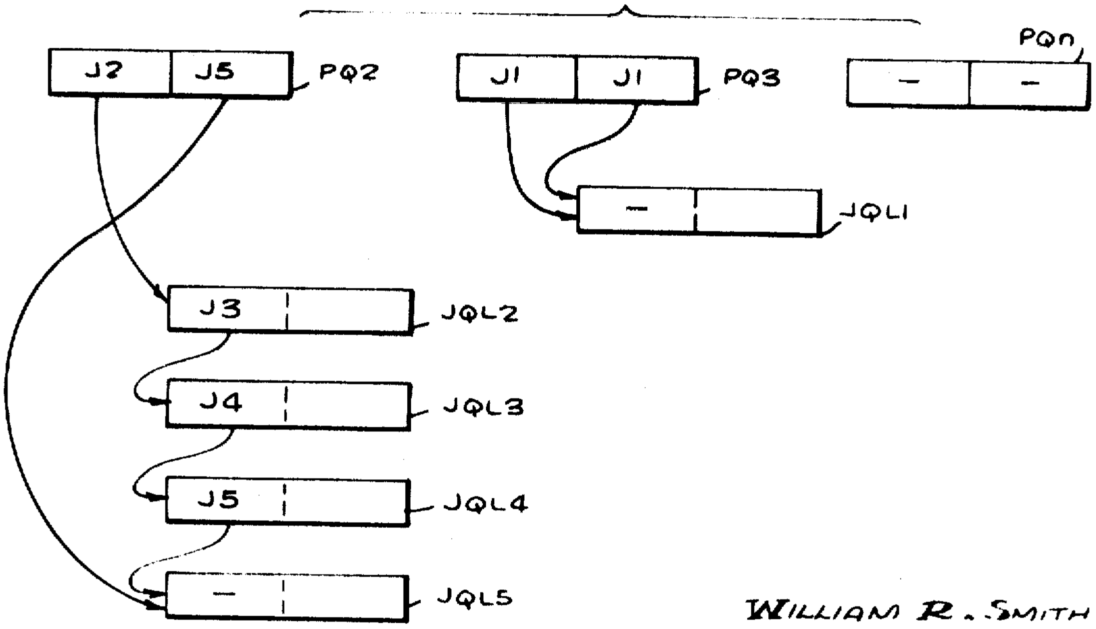
Figures 7, 8:
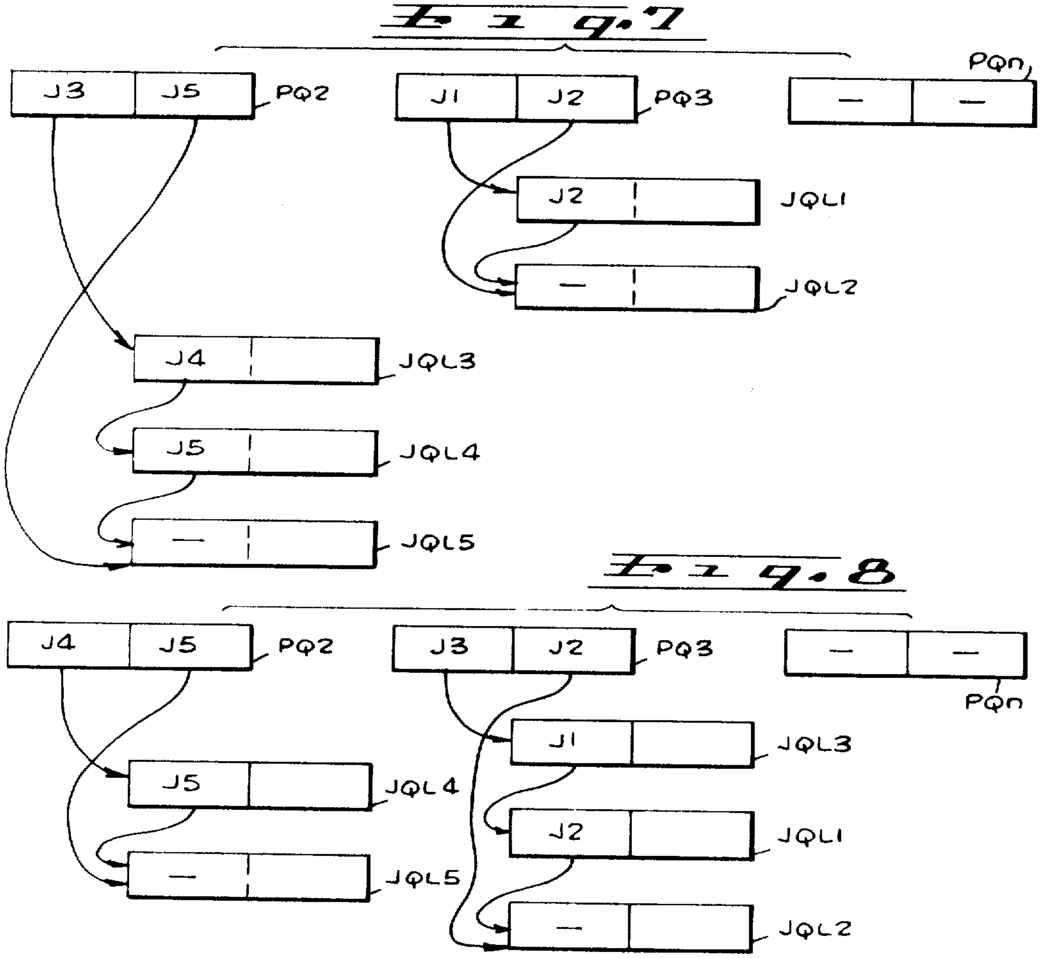
Figure 9:
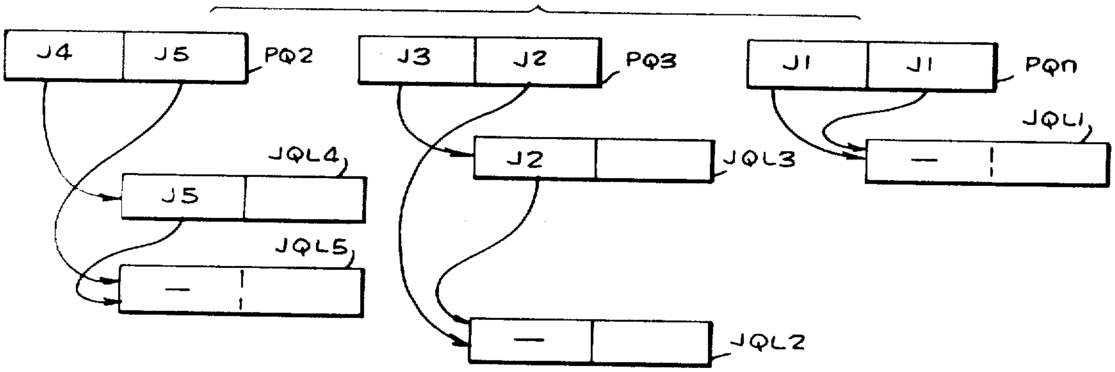

From a diagrammatic point of view, the addition of a job to the top of the queue is accomplished by replacing the linkage between the PQ2 word and the JQL3 word, represented in FIG. 3 by arrow 40 with a linkage between the PQ2 word and the new top JQL word, represented by arrow 41 in FIG. 3*a* and the linkage between the new top JQL word and the previous top JQL word, represented by arrow 42. A similar technique is employed to add a job to the bottom of a queue as diagrammed in FIG. 3*b*. By comparing FIG. 3*b* with FIG. 3 it becomes apparent that the addition of a job such as J11 to a bottom of a queue may be accomplished by placing the job number (J11) of the new bottom job in the QB field of the PQ word as well as in the QL field of the JQL word (JQL5) associated with the previous bottom job. From a linkage point of view the linkage, represented in FIG. 3 by arrow 45, is replaced by the linkages represented by arrows 46 and 47 in FIG. 3*b*.

A similar technique of modifying the contents of fields of various control words is employed by the JC in deleting a job from a queue. FIG. 3*c* will be used to explain the deletion of a top job from a queue, while FIG. 3*d* will be used to explain the deletion of a job other than the top job in a queue.

By comparing FIG. 3 with FIG. 3*c* it becomes apparent, that a top job may be deleted from a queue by placing the content of the QL field of the JQL word associated with the job being deleted in the QT field of the PQ word. In the particular example, J3 is deleted by placing the content (J2) IN THE QL field of JQL3 in the QT field of PQ2, as shown in FIG. 3*c*. Thus after J3 is deleted the top job in the queue is job J2.

As previously stated, FIG. 3*d* is useful in explaining the deletion of a job other than from the top of the queue. In order, however, to explain the conditions in which such a deletion requirement may arise, a few preliminary remarks are believed to be in order. Briefly in accordance with the teachings of the present invention when a processor is ready to receive the assignment of a task for any of the jobs in its queue, the top job in the queue is assigned to the processor. Assuming for example that processor P2 is ready to assume the performance of a task for any of the jobs in its queue as shown in FIG. 3, job number J3 is assigned to the processor. If P2 finishes the performance of a task for J3 before any jobs are added to its queue, upon completion of the task for J3, the JC deletes job J3 from the queue of P2 as described in connection with FIG. 3c.

If however while P2 performs the task for J3, a job number such as J9 is added to its queue, as hereinbefore explained in connection with FIG. 3a, when P2 finishes with the performance of the task for J3, J3 is no longer at the top of the queue, thus it is necessary to delete J3 from other than the queue top. Comparing FIGS. 3a and 3d, it may be seen that J3 may be deleted from the queue of P2 by first determining the JQL word which contains the number J3 to be deleted and thereafter placing in the QL field of such a JQL word the content of the QL field of the JQL3 word. In the particular example JQL9 is found to contain the number J3 to be deleted. Thus its QL field (see FIG. 3d) is used to store the number J2 found in the QL field of JQL3. Once the content of JQL3 is placed in JQL9, JQL3 is deleted from the queue of P2.

In accordance with the teachings of the present invention the job controller operates in a three cycle mode of operation. The three cycles are defined as the Delete cycle, the Add cycle, and the Assign Task cycle. When any of the processors (such as P2) completes the performance of its task for a job (such as J3) assigned thereto, it supplies a signal indicating such completion to the JC via its Processor Controller. This signal will hereafter be referred to as a Needs Service (NS) signal. When this signal is received the JC enters the Delete cycle in which the job such as J3 for which the task was just completed by a processor such as P2 is deleted from the Processor's queue. The JC is then automatically switched to the Add cycle. In this cycle the processor P2 which is being serviced supplies the JC with signals indicating the next processor to operate on job J3. Hereafter such signals will be referred to as a Completion Code (CC). The JC uses the CC to add J3 to the particular processor. Thereafter the JC is automatically switched to the Assign Task cycle in which it assigns tasks to the various processors which are not busy from the tops of their queues. In the particular example job J2, which after the deletion of J3 from the queue of P2 is the top job in the queue of P2, is assigned to P2.

The foregoing description may best be summarized in conjunction with FIGS. 4–12. FIG. 4 is in the form of a multicolumn chart which is used to define nine successive time periods t0–t8 during which the system is assumed to be operating on jobs J1–J5 with processors P2, P3 and P*n*. The left-hand column under the heading TIME PERIOD is used to designate the various time periods. Each entry under the column heading COMPLETION indicates the processor which needs service at the beginning of each time period as well as the completion code (CC) provided by such processor. As previously stated, the CC indicates the processor or queue to which should be added the job on which the processor which needs service just completed the performance of a task.

Figure 11:
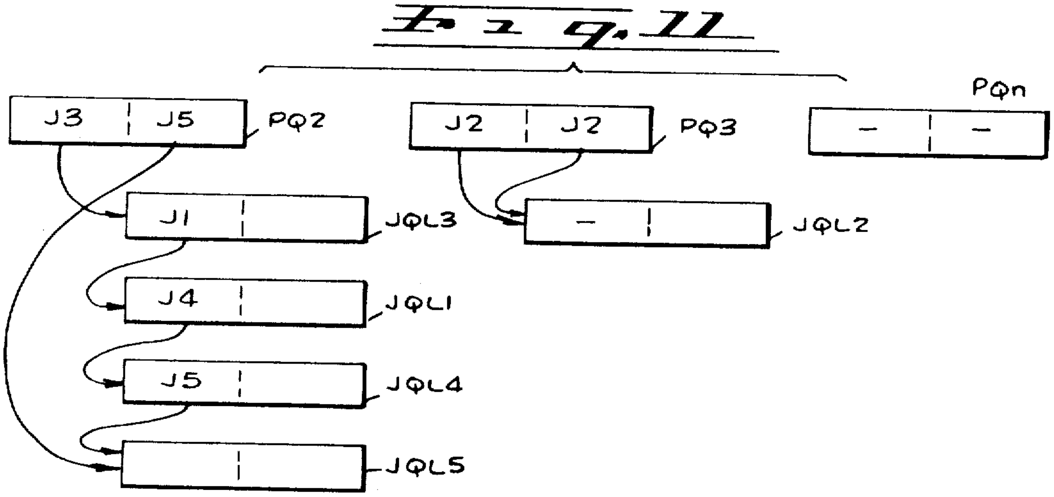
Figure 12:
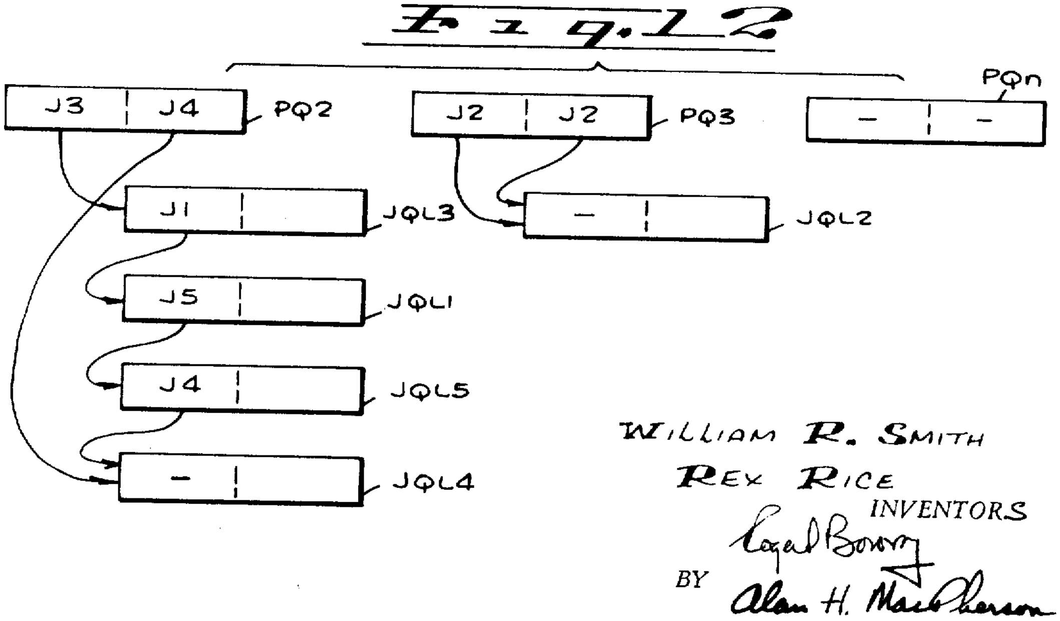

The CC also denotes the type of Q add function to be performed. The entries during each time period under the heading JC THREE-CYCLE MODE OF OPERATION indicate the JC's performance at the start of each time period. The entries under the subcolumns with the headings Q2, Q3, and Qn represent the job numbers in the three queues for the three processors P2, P3 and P*n*, while the entries in the right-hand subcolumns with the headings P2, P3 and Pn represent the jobs assigned by the JC to the various processors for task performance during each time period. FIGS. 5–11 represent diagrams of the three queues of the three processors during time periods *t*0–*t*6, respectively, while FIG. 12 represents a multiqueue diagram for each of time periods t7 and t8.

For explanatory purposes, let it be assumed that during time period t0 processor P2 has a queue Q2, which includes all the five jobs J1–J5 and that P2 is performing a task for the top job number J1. It it also assumed that during t0 both processors P3 and Pn are idle. A processor is idle if its queue is empty. As seen from the chart, at the start of t1 processor P2 is assumed to have completed the performance of its task on J1, the job previously assigned thereto, and it is further assumed that P2 provides the JC a Completion Code (CC) indicating that the job number previously assigned thereto should be added to the bottom of Q3 as indicated by the entry P2 (Q3,BOT). That is, P2 indicates to the JC that it needs service and that the job (J1) on which it (P2) previously operated should be added to the tasks to be performed by P3.

In response thereto the JC enters its three-cycle mode of operation. During the first cycle, the Delete cycle, the JC deletes the job number on which P2 operated, i.e., J1 from the queue of P2. Thereafter the JC enters its second cycle, the Add cycle mode of operation. In this cycle it adds J1 which was deleted from Q2 to the bottom of Q3 as indicated by the CC provided by processor P2 which is being serviced. In the particular example J1 is added to a previously empty Q3. Therefore as seen from FIG. 6 both fields of the PQ3 word associated with processor P3 point to J1. After deleting J1 from the Q2 and adding J1 to Q3 the JC enters its third cycle of operation, namely the Assign Task cycle. In it, it assigns the job number in the top of each queue to its respective processor which is not busy. In the present example, since during the preceding time period *t*0, P3 was idle, and since at the start of *t*1, P2 requests services, two processors (P2 and P3) are assigned the job numbers at the top of their respective queues. That is, the job J2 is assigned to P2 and J1 is assigned to P3. It should be pointed out that at this point in time processor Pn is also idle. However, the JC cannot assign any task thereto since its queue, i.e., Q*n* is empty.

During the rest of time period t1 processor P2 performs the task for J2 and processor P3 performs the task for J1. They continue performing the tasks for their respective job numbers until the start of time period *t*2 when it is assumed that P2 again completed the performance of its task and again provides a CC indicating that the job previously assigned thereto should be transferred to the bottom of Q3 of processor P3. Since the job for which P2 previously performed a task is J2 it is deleted from Q2 of P2 and during the subsequent Add cycle, CC, provided by P2 is used to add J2 to the bottom of Q3. Thus at this point in the operation of the system job numbers J3, J4 and J5, in this order form Q2 (see FIG. 7) while job numbers J1 and J2 form Q3 of P3.

The JC then enters the Assign Task cycle attempting to assign a task to each of the nonbusy processors. However, since processor P3 is busy, being assumed that it has not as yet finished its task for job J1, and since Q*n* for processor Pn is empty, the only processor to which a task can be assigned is processor P2. The JC assigns a task to processor P2 by assigning thereto the top number, i.e., J3 in its Q2.

The example associated with time period *t*2 is presented to show the addition of a job number to the bottom of a queue of an active processor, such as P3, while the example presented in connection with the time period *t*1 represents a case in which a job number is added to the bottom of a queue which was previously empty and therefore associated with an idle processor.

At the start of period t3, P2 needs servicing, having completed the performance of its task for job J3 previously assigned thereto. Also, P2 provides a CC indicating that the job (J3) for which a task was just completed should be added to the top of Q3. It should be pointed out that at this point in time P3 is busy performing its task for J1. Thus, during the start of t3 the JC adds J3 to the top of Q3 displacing job number J1 from the top of the queue. The example in connection with time period t3 is presented to indicate that a job number may be added to the top of the queue of an active processor which continues to perform tasks for a job whose number is no longer at the top of the queue.

At the start of *t*4, P3 needs servicing. Since previously P3 performed a task for J1, J1 has to be deleted from its queue. However, from FIG. 4 and FIG. 8, the latter representing a diagram of the various queues at the end of *t*3 and the start of *t*4, it is seen that JQL1 associated with job number J1 is not at the top of Q3. Consequently a deletion of a job number from the middle of the Q3 has to be performed. Such an operation has been previously described in connection with FIG. 3*d*. Thus from the foregoing it should thus be appreciated that the JC is capable of deleting a job number either from the top of the queue or from any location within the queue. At *t*4, J1 which is deleted from Q3 is added to Q*n* which was previously empty. Thus J1 represents the top as well as the bottom job number in Q*n*. Then when the JC is operated in the Assign Task cycle it assigns tasks to both P3 and P*n* by assigning J3 to P3 and J1 to P*n*. That is, the JC assigns to each of processors P3 and P*n* the job number from the top of its respective queue.

The example in conjunction with time period *t*5 is presented to indicate the deletion of a job (J1) from the top of a queue (Q3 of P3) which in essence empties the queue (Q3) so that its respective processor remains idle. The example is also used to show the addition of the job (J1) to the top of a queue (Q2) associated with an active processor (P2). The example in connection with time period *t*6 is presented to indicate the system's capability of deleting a job number from the top of one queue and adding it to the top of another queue.

Unlike the foregoing examples in which a job number is deleted from the queue of a processor which just completed the performance of its task on a job and the addition of the job to the queue of another processor, the two examples in connection with time periods *t*7 and *t*8 are presented to indicate the system's capability of deleting a job number from the queue of a certain processor and adding it to the same processor's queue. As seen from FIG. 4 at the start of *t*7, processor P2 indicates that the job number (J2) previously assigned thereto should be deleted from its queue while at the same time its CC indicates that the same job number should be added to the bottom of its queue Q2. Such a capability is particularly desirable to insure that the processor is not devoted to the performance of a task for one job for an unlimited time regardless of the number of jobs which are awaiting its services.

Each of the processors may include a clock to time the duration devoted to the processing for each job. Then if more time is required than the selected duration the processing for the particular job may be terminated and the next job in the processor's queue assigned to the processor. However, in order to insure that the processor returns to complete the job terminated in the middle, the particular job may be added or readded to the processor's queue. In the example in conjunction with time period *t*7, job J4 is deleted from Q2 which prior to the deletion was comprised of job numbers J3, J1, J4 and J5, and is added to the bottom of the queue. Then when the JC operates in its Task Assign cycle job J3 is assigned thereto for processing. J4 is placed at the bottom of Q2 and will be supplied to P2 for subsequent processing only after P2 has processed at least jobs J1 and J5 preceding J4 in Q2.

The example in connection with time period *t*8 is similar to the example in connection with time period *t*7. However at time *t*8, J2 is deleted from Q3 which only includes J2. Consequently when it is readded to Q3 it is again the top job in Q3. Therefore, during the Task Assign cycle JC assigns J2 to P3. Thus even though J2 was deleted from Q3 during the Delete cycle by being readded to Q3 during the Add cycle, it is again reassigned to P3 for continued processing.

From the foregoing description it should thus be apparent that the JC controls the flow of task performance for each multitask job by sequentially adding the job number to the queues of the various processors which are to perform tasks for the job. Also, the JC controls the sequential assignment of tasks to each processor by assigning a job number to the processor from the top of its queue after the processor has completed the performance of a task for a previous job. After the job is completed, the last processor to perform a task for the job is assumed to provide a CC which indicates that the completed job should be added to the queue of the Output Processor P1. The JC operates on the queue of P1 by sequentially assigning the numbers of completed jobs thereto to enable it to communicate data words representing a completed job to the source which originally requested the performance of the job.

As hereinbefore assumed, unlike the other processors, the Input processor (P0) does not have a queue. For explanatory purposes it may be assumed that when control words are received from any of the sources on which a job is to be performed the Input processor assigns a job number and identifies the source with the assigned job number. Then when a request is received from the source for the performance of the job on such control words, the Input processor supplies the JC with signals in the form of a completion code which represents the first processor which is to perform its task on the job. Once the processing of a job is initiated by the first processor the performance of sequential tasks is controlled by the JC, as hereinbefore described, until the completed job is transferred to the Output processor which communicates or supplies the processed word to the source which initially supplied the control words and requested the job performance.

From the foregoing description of Queue formation and Queue modification, by the deletion of job numbers from queues and the additions of such job numbers thereto, it should be apparent that a queue is formed for each processor (except for P0) by controlling the content of the two fields of the processor's PQ word as well as the QL fields of the various JQL words which form part of the queue. At any given time the content of each of fields QT, QB and QL represent a job number. It is the basic function of the JC 10 to control the contents of these various fields by means of special-purpose hardware, which will now be described.

Figure 13:
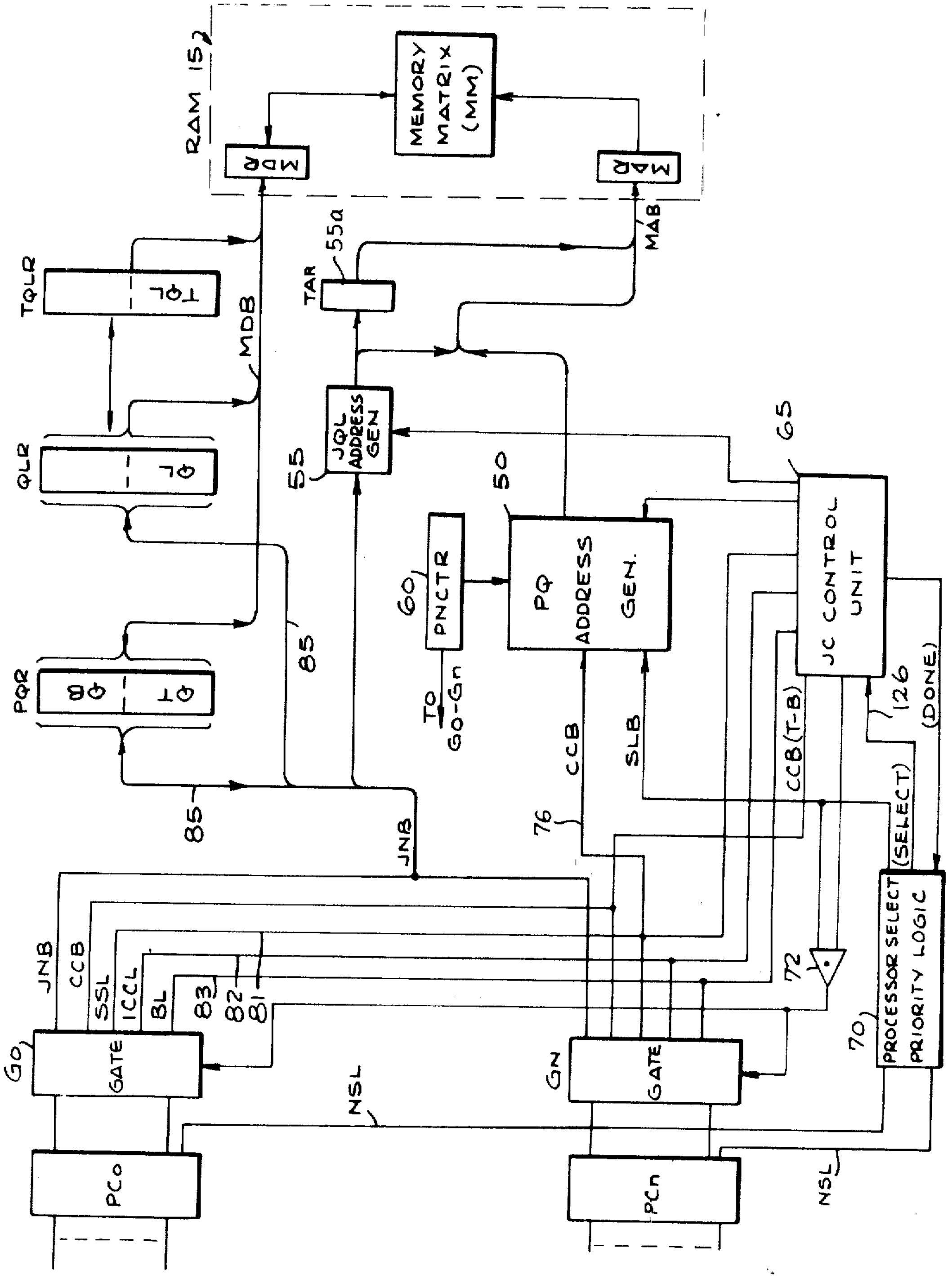
FIG. 13 is a block diagram of the novel Job Controller of the instant invention.
Figure 11:
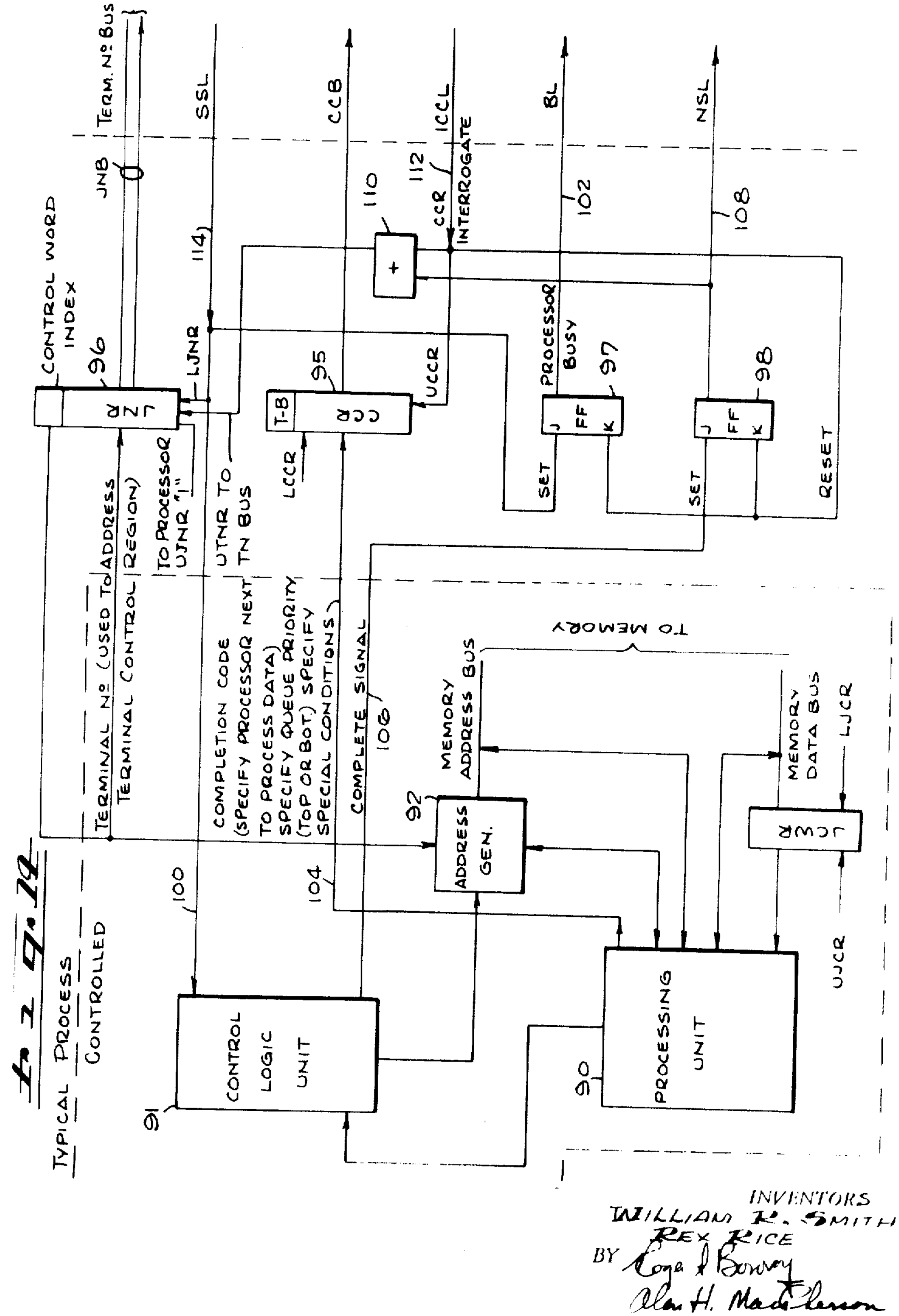

Reference is now made to FIG. 13 which is a block diagram of the novel JC 10 of the instant invention. Therein the processor controllers PC0–PC*n* and the RAM 15, with which the JC 10 is in communication (see FIG. 1), are also diagrammed. Briefly, the JC 10 includes a pair of working registers PQR and QLR which are in two way communication with the memory data register (MDR) of RAM 15 via the memory data bus (MDB). PQR is used to store temporarily or hold a PQ word retrieved from the memory matrix (MM) of RAM 15 on which the JC is to operate. Likewise QLR is used for temporarily storing or holding a QL word on which the JC is to operate. After determining the content or modifying one or more of the fields of either of the control words, either word is returned to its appropriate cell in the matrix.

The retrieval and storing of any of the PQ words is achieved by supplying its address to the MAR from a PQ address generator 50 via MAB. Likewise a JQL address generator 55 is used to generate the address of any of the JQL words which is needed for the JC's operation. The JC also includes a Temporary QL Register (TQLR) which is in two way communication with the QLR and the MDR. The function of the TQLR is to receive a QL word or a field thereof from QLR for temporary storage whenever the QLR need be used for holding another QL word. That is, whenever two QL words have to be operated upon by the JC the TQLR is used to hold one of them. Similarly, the JC also includes a Temporary Address Register (TAR) 55*a* which is connected to the MAB. Under certain conditions to be described, the address generated by either generator 50 or 55 which is supplied to the MAR may also be stored in the TAR for subsequent use. As is appreciated by those familiar with the art, the transfer of the content of one register (or generator) or any field thereof to another register or to a field thereof may be achieved by providing appropriate Load and Unload signals. In the JC, such signals as well as other control signals are supplied by JC Control Unit 65.

Each processor controller (PC) which is in communication with its respective processor is coupled to the JC 10 through a respective gating network. The gating networks, hereafter referred to as gates, are designated G0–G*n*. The function of each gate is to enable its PC to communicate with the JC when the gate is properly enabled. Each PC is directly connected to a Processor Select Priority Logic, represented by block 70, by means of a Need Service Line (NSL). Priority Logic 70 is used to sense which of the processor's needs servicing and supply the processor's number as a multibit pattern (assumed to be $x$ bits) to the generator 50 via a Select bus (SLB). The SLB as well as the previously referred to busses and those to be referred to hereafter are all assumed to be multiline busses by means of which multibit patterns are communicated. The number of lines depends on the bit patterns to be communicated.

The SLB is also connected to each of the gates G0–G*n* through a control gate 72. Gate 72 actually decodes the processor number in the SLB and enables the gating network of the particular processor to enable its processor controller (PC) to communicate with JC 10. If at any instant in time two processors need servicing simultaneously the Priority Logic 70, as will be described hereafter, selects the processor of the higher priority to be serviced first.

Each PC is connected via its respective gate to a Job Number bus (JNB) which is shown connected to the JQL address generator 55 as well as to a Completion Code bus (CCB) 76 which is shown connected to the PQ address generator 50. Each PC is also connected via its respective gate to the JC Control Unit 65 by three separate lines. These lines include a Start Signal Line (SSL) 81, an Interrogate Completion Code Line (ICCL) 82 and a Busy Line (BL) 83.

The function of the busses and the lines will be described hereafter in great detail in connection with a complete description of the operation of the JC 10. However, briefly stated, the JNB is used to communicate a job number (JN) between the JC and the selected processor which is being serviced or to which a task is assigned. The JNB in addition to being connected to the address generator 55 is also connected in the JC 10 to internal busses, generally designated by numeral 85, so as to enable a job number on the JNB to be stored in any of the fields of the working registers. The busses 85 and the JNB are also used to supply a job number to one of the processors from any of the fields.

The function of the CCB is to communicate to the JC the completion code (CC) which includes the number of the next processor which is to perform a task on a given job. The processor number is supplied via CCB to the PQ address generator 50 which when enabled by a control signal from control unit 65, supplies the MAR, via MAB, the address of the PQ word of the processor whose number is indicated on the CCB. A selected line of the CCB is also connected to the control unit 65 to supply it with a one bit code to indicate whether the job should be added to the top or the bottom of the queue of the processor which is next to perform a task on the job.

The SSL is used to provide a processor to which a task is assigned with a start signal, while ICCL is used to interrogate the completion code (CC) which may be supplied by a processor which is being serviced. The BL is used during the Assign Task cycle to determine which processor is not busy, i.e., idle and in condition to receive the assignment of a new task.

The basic function of the JC control unit 65 is to control the hardware of the JC to service any of the processors as soon as the processor needs servicing, i.e., is finished with the performance of a task for one job and is ready to assume the performance of a task for another job. Unit 65 is assumed to include all the logic circuitry necessary to perform the three-cycle mode of operation hereinbefore explained. The operation of unit 65 will hereafter be described in conjunction with flow charts and examples of logic circuitry incorporated therein in order to explain fully the manner in which the JC forms the various queues and updates them as the need arises. However, before describing the manner in which the unit 65 controls the JC's operation the foregoing description of the JC may best be summarized in connection with a specific example such as the JC's three-cycle operation at the start of time period *t*4, hereinbefore explained in conjunction with FIG. 4.

As herebefore explained, at the start of time period *t*4 P3 needs servicing by indicating that it has completed the performance of a task on J1, previously assigned thereto, and that J1 should be added to the top of Q*n* of processor P*n*. In operation, when P3 needs servicing, a condition which is indicated when the Need Service Line (NSL) of P3 is at a selected binary level such as true, the Priority Logic 70 supplies the number of P3 on the SLB to the PQ address generator 50 as well as to gate 72. Actually gate 72 represents *x* gates which respond to the *x*-bit pattern on the SLB representing the selected processor P3 so that only the gate G3 associated with processor P3 is enabled. The SLB is also connected to control unit 65 to indicate that one of the processors needs servicing which initiates the three-cycle mode of operation of the JC.

During the first cycle, i.e., the Delete Cycle, the processor number (P3) supplied to generator 50 via the SLB is used to generate the address of the PQ of P3 and store the PQ word in PQR. The job number, i.e., J1, on which P3 performed a task is supplied to the JC via the JNB from processor P3. It is then used to locate the JQL1 in Q3 of P3 and delete it therefrom. During the second cycle, i.e., the Add cycle, the completion code bus (CCB) is used to receive the number of the next processor which is to operate on J1 from P3. In the particular example that number is P*n*. The number P*n* supplied by CCB to address generator 50 is used to retrieve PQ*n* from the memory matrix of RAM 15 and the number of J1 on the JNB is used to activate address generator 55 to retrieve JQL1 from memory and temporarily store it in QLR. Once PQ*n* and QLR1 are stored in their respective working registers the JC continues to perform a series of steps needed to add JQL1 to Q*n* of P*n*.

As shown in FIG. 13 the CCB also is connected to the control unit 65 to provide it with a one-bit code to indicate whether the job should be added to the top or bottom of the queue of the next processor. In the particular example this code would indicate that J1 should be added to the top of Qn.

After the completion of the Add cycle operation the unit 65 automatically controls the JC to enter and execute the third cycle, i.e., the Assign Task cycle of operation. In this cycle gate 72 is disabled and the output of the Processor Number Counter (PNCTR) 60 is used to sequentially enable the gates G0–G*n*. For each processor its busy line (BL) is interrogated by the control unit 65 to determine whether the processor is busy or not. Each processor which is found not to be busy, i.e., idle, its PQ word is retrieved from memory by using the output of PNCTR 60 to generate the PQ word address and the job number at the top of the queue, which as previously indicated is located in the QT field of the PQ word, is supplied to the processor via the JNB. Thus a job is assigned to the idle or not-busy processor. Thereafter the control unit 65 supplies a start signal via the Start Signal Line (SSL) to enable the processor to which the new task was just assigned to perform its processing operation thereon.

In the particular example, in conjunction with time period *t*4, during the Assign Task cycle, since P3 is not busy a non-busy signal will be received from P3 via BL when the count from Processor Number Counter 60 is three (3), as a result of which the number will be used to retrieve PQ3 and assign J3 to P3 from the Q7 field. Then when the number from PNCTR 60 is *n*, representing the number of the last processor P*n* which is idle, a nonbusy signal will be received since P*n* is not busy. Consequently the number *n* will be used to retrieve PQ*n* and assign the job number J1 to P*n*. After determining the status of the last processor (Pn in the present example) the control unit 65 provides a Complete signal to the Priority Logic 70 to indicate the completion of its three-cycle mode of operation. Thereafter the Priority Logic 70 is again in condition to supply to the JC an indication that another of the processors to which it is connected is in need of servicing.

Reference is now made to FIG. 14 which is a simplified block diagram of a typical processor and a typical processor controller (PC) associated therewith. Each typical processor is assumed to include a processing unit 90, a control logic unit 91, an address generator 92 and a Job Control Word Register (JCWR). Each typical PC is assumed to include a Completion Code Register (CCR) 95, a Job Number Register (JNR) 96, a flip-flop 97, which will hereafter be referred to as the busy flip-flop and a flip-flop 98, which may hereafter be referred to as the Needs Service flip-flop.

In operation, when a job is assigned to a processor during the JC's Assign Task cycle of operation the job number (JN) is loaded into the JNR when a Start Signal is supplied to the control logic unit 91 via a line 100. This line is connected (through the PC) to the SSL. The received Start Signal is also used to set the busy flip-flop 97 so that its output line 102 which is connected to the BL in the JC is true, thereby indicating that the processor is busy, i.e., it is in the process of performing a task for one of the jobs.

When the Start Signal is received by the control logic unit 91 the job number in the JNR is transferred to the address generator 92 to generate the address of a Job Control (JC) word associated with the job, retrieve it from memory and temporarily load it into the JCWR. As seen from the format of the JC word shown in FIG. 2, each JC word includes a Start Task Instruction Address (STIA) field. This field is used to contain the address of an instruction word or an instruction which is used by the processing unit 90 to determine the point in the job at which the processor is to assume its task or processing operation. Once the JC word is in the JCWR the processing unit 90, in conjunction with its control logic unit 91, performs its task on the job whose number is in the JNR.

As shown in FIG. 14, the processing unit 90 is directly connected to the MDB and the MAB, thereby enabling the processor to receive words necessary for its task performance from the memory as well as supply words thereto. Since, as hereinbefore indicated, the particular processing or task which each of the processors performs is not material to the instant invention the task performance of each processor will not be described herein.

At the end of the task performance the processing unit 90 supplies a Completion Code to the CCR in its associated processor controller via line 104. The Completion Code includes the number of the next processor which is to perform a task on the job as well as a one-bit indication whether the job should be added to the top or bottom of the queue of the next processor. The CCR may include one bit, designated T–B, whose binary state may be used to indicate whether the job should be added to the top or bottom of the queue of the next processor.

Also, as part of the completion of the performance of the task, processing unit 90 controls the content of the Start Task Instruction Address field of the JCWR and restores the JC word of the job for which it just completed the performance of the task in the memory matrix. After returning the JC word to the memory matrix the control logic unit 91 provides a Complete Signal via line 106. This Complete Signal sets the Needs Service flip-flop 98.

When Needs Service flip-flop 98 is set an OR-gate 110 is enabled to supply an Unload signal to JNR, designated UJNR. As a result the job number in the JNR is in condition to be supplied to the JNB. When the JC 10 is in condition to service the processor which needs servicing, during the Delete cycle, the job number in the JNR representing the job for which the processor just completed the task is supplied to the JC via the JNB.

After the job is deleted from the queue of the processor and the JC is operated in the Add cycle mode of operation, the ICCL which is connected to line 112 is set to a true level. Consequently an Unload CCR (UCCR) signal is supplied to the CCR as a result of which the completion code (CC) in the register is supplied to the JC via the CCB. Also, when line 112 is true OR-gate 110 is enabled to unload the job number in the JNR to the JNB for use by the JC. In addition, the true level of line 112 resets flip-flops 97 and 98.

When flip-flop 97 is reset its output line 102 is at a false level indicating that the processor is not busy. This level is sensed by the JC during the Assign Task operation to assign a task to the processor. During the Add cycle of operation the JC uses the Completion Code supplied thereto from the processor controller via the CCB and the job number from the JNR which is supplied thereto via the JNB. Then, during the Assign Task cycle of operation, when sensing that the busy flip-flop 97 is reset and its output line 102 is at a false level, a job is assigned to the processor by loading the JNR with the job number at the top of its queue and by supplying it with a Start signal via line 114, which is directly connected to the SSL. Also, line 114 on which the Start signal is supplied is used to set the busy flip-flop 97 to indicate that it is busy since a task has just been assigned thereto.

Figure 15:
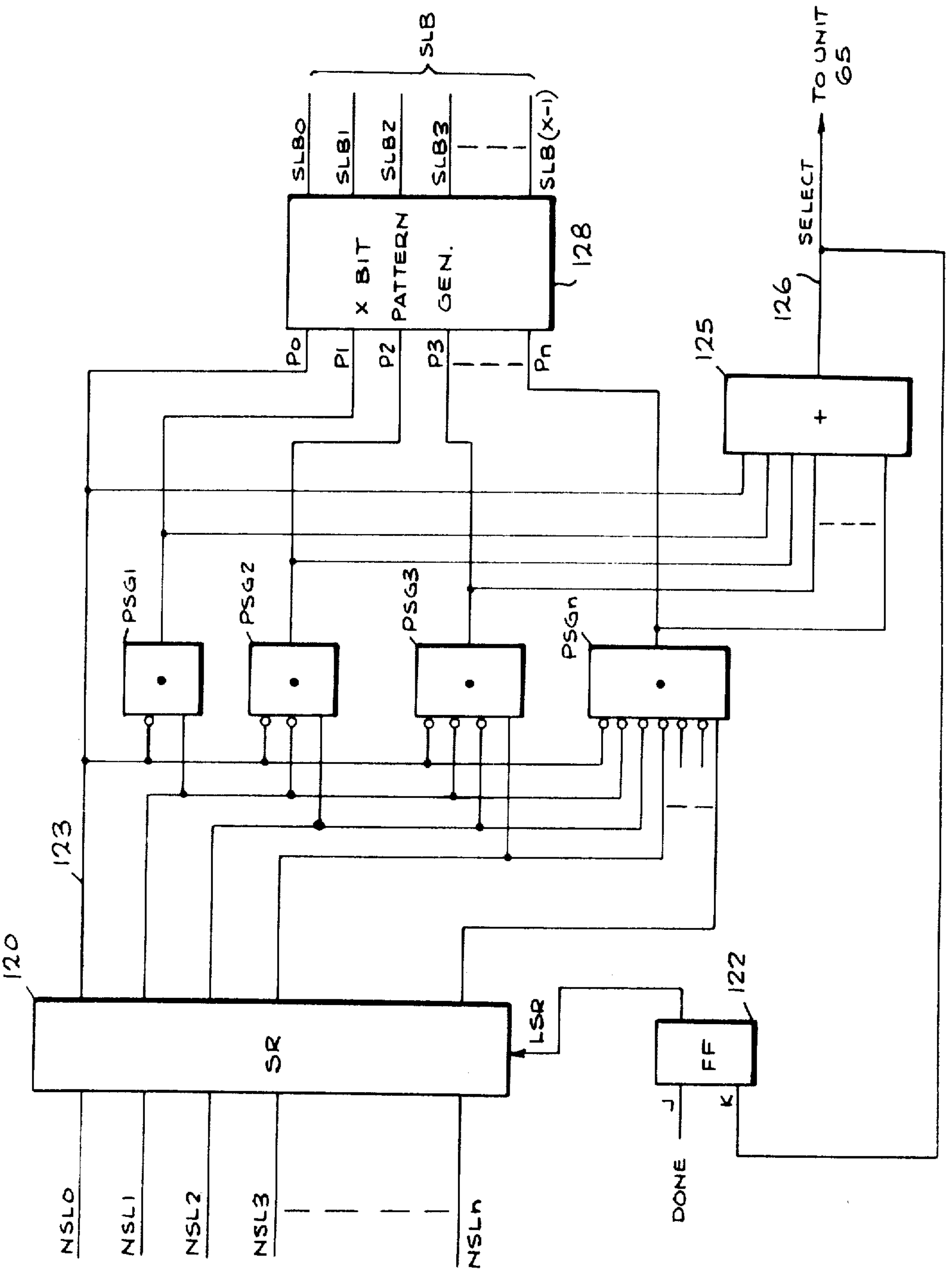
FIG. 15 is a simple block diagram of a Processor Select Priority Logic 70 shown in FIG. 13.

FIG. 15 to which reference is now made represents a simple block diagram of the Processor Select Priority Logic 70. Logic 70 includes a Service Register (SR) 120 to which the Needs Service Lines (NSL) of the various processor controllers are connected. The Priority Logic 70 also includes a Service flip-flop 122 which provides a Load SR (LSR) signal to register 120 when the flip-flop is in a set state. When the JC 10 is in condition to service any of the processors the flip-flop 122 is set. As long as none of the processors needs servicing each NSL is at a false level representing a binary 0. Thus all the bits of SR 120 are zeros. Consequently the output line 123 of SR 120 associated with its bit to which NSL 0 is connected and the outputs of a plurality of Priority Select Gates PSG1–PSG*n* to which the output lines associated with the rest of the bits of SR 120 are all at false levels. As a result OR-gate 125 is disabled providing a false level on its output line 126.

The gates PSG1–PSG*n* are connected to SR 120 to define a priority order in which P0 is assumed to be of highest priority. At any point in time only line 123 or the output of one of gates PSG1–PSG*n* can be at a true level, depending which processor needs service. If two processors need service simultaneously the one of higher priority is selected by the gates PSG1–PSG*n*. Thus the line at a true level represents the selected processor. Whenever any of these lines is at a true level OR gate 125 is enabled resetting FF122 to inhibit the content of SR 120 from changing until a new processor can be selected. The output line 126 when being at a true level represents a "Select" signal which is supplied to unit 65. The line 123 and the output lines of PSG1–PSG*n* are supplied to a $x$-bit pattern generator 128 which provides a $x$-bit pattern to the Select Bus (SLB), the pattern representing the number of the selected processor. When the Select signal is supplied to unit 65 of the JC it initiates its three-cycle operation, at the end of which a DONE signal is supplied to set FF122 and thereby enable the SR 120 to be loaded as a function of the levels of the NSL's.

Figure 16:
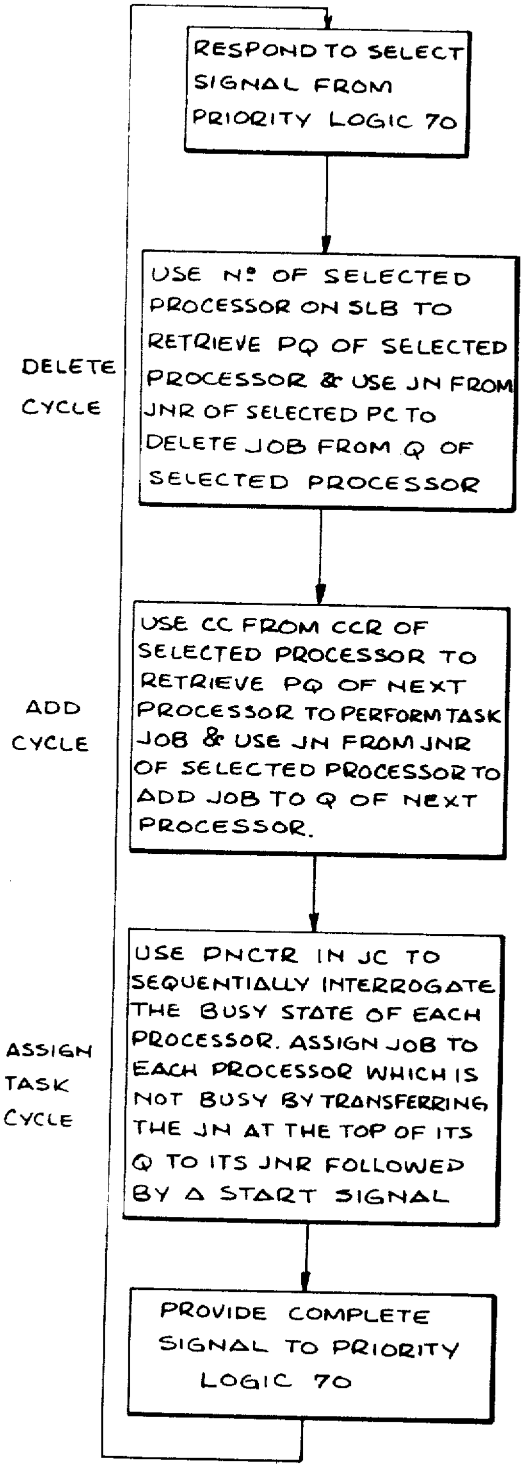
FIG. 16 is a simplified flow chart summarizing the three-cycle mode of operation of the Job Controller.
Figure 17:
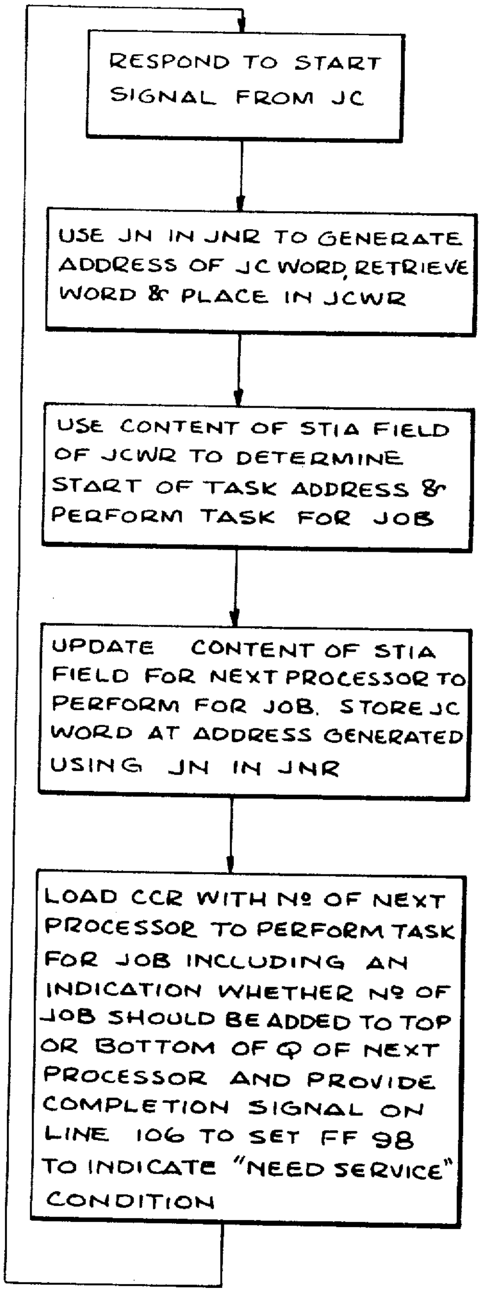
FIG. 17 is a flow chart used to summarize a typical operation of a typical processor and its associated processor controller.

Based on the circuitry shown in FIGS. 13, 14 and 15, the three-cycle mode of operation of the JC is summarized in the simplified flow chart shown in FIG. 16. Likewise a simplified flow chart shown in FIG. 17 is used to summarize a typical operation of a typical processor and its associated processor controller. It is believed that the flow charts are self-explanatory.

From the foregoing description in conjunction with FIG. 13 it should be apparent that the PQ address generator 50 is used to generate the address of a PQ word of a processor whose number is supplied to generator 50 on either the SLB or the CCB or as the output of PNCTR 60. Likewise JQL address generator 55 is used to generate the address of a JQL word associated with a job whose number is supplied to the generator from any of the fields of the working registers PQR and QLR shown in FIG. 13 beneath the Figure identification or from the JNB. Similarly, in a typical processor, its address generator 92 utilizes the job number supplied thereto from the JNR (FIG. 14) to generate the address of the JC word associated with such a job number. It should be apparent to those familiar with the art that different design techniques may be employed in implementing such address generators.

Figure 18:
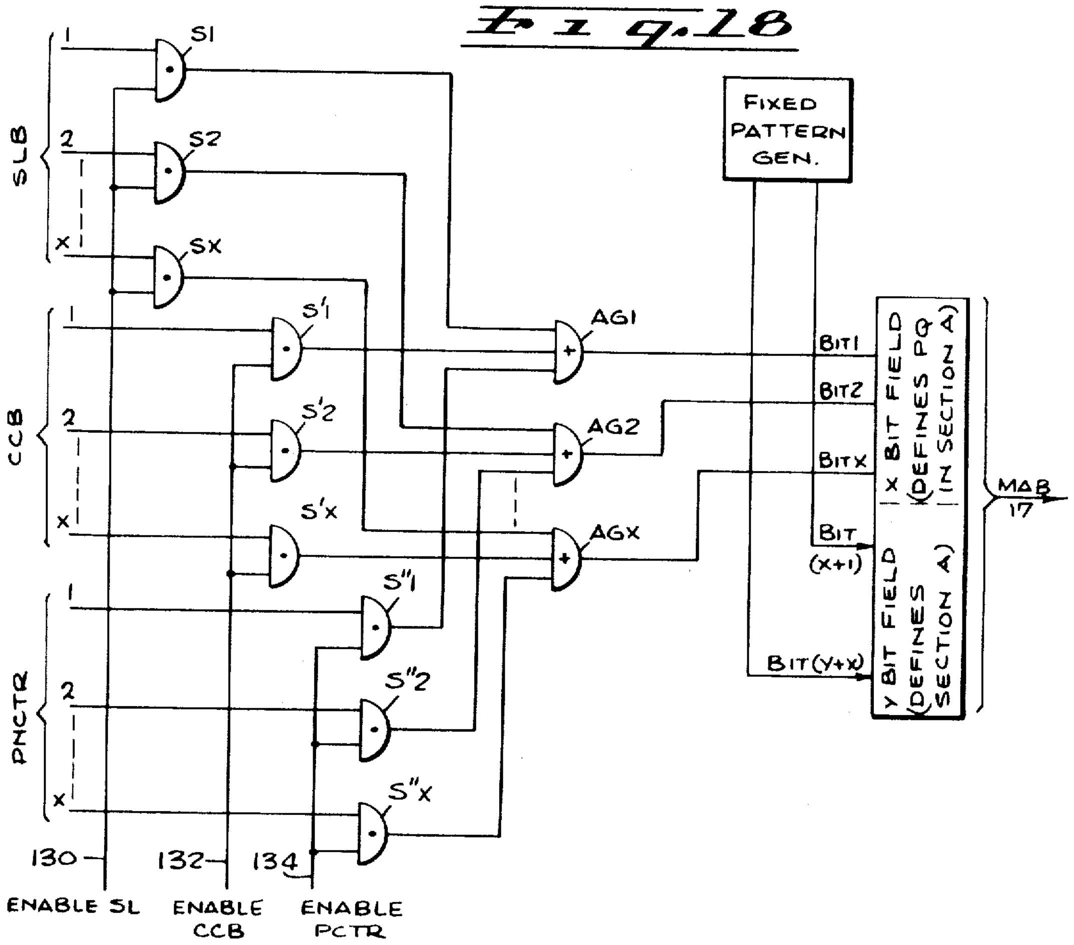
FIG. 18 is a block diagram of an address generator.
Figure 19:
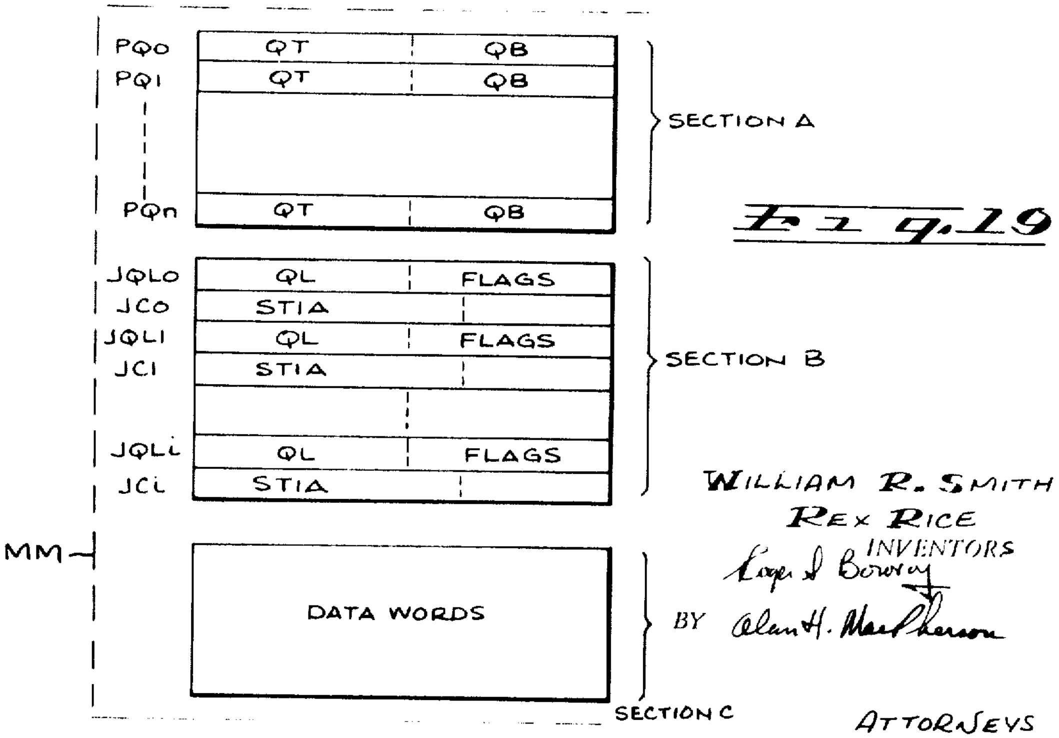
FIG. 19 is a format diagram of a memory matrix of RAM 15, shown in FIG. 13.

One example of the implementation of PQ address generator 50 is represented in block form in FIG. 18 to which reference is made herein. For the particular implementation it is desirable to assume that the memory matrix (MM) of RAM 15 consists of three addressable sections A, B and C, as shown in FIG. 19 and that section A includes all the storage locations of cells in which the PQ words of the various processors P0–P*n* are stored. Section B is assumed to include all the cells in which the two control words JQL and JC associated with each number job are stored, while section C is assumed to include all the cells in which various data words which are supplied for processing or which result from processing of any of the processors are located. Let it further be assumed that the address of any cell in the memory matrix may be represented by a $(y+x)$ bit pattern and that $y$ of the higher order bits are common to all the addresses in Section A, while the $x$ lower order bits define the addresses of the various cells in which PQ0 through PQ$n$ are stored.

In such an arrangement the PQ address generator 65 may include a fixed $y$-bit pattern common to all the addresses in section A, while the output of $x$ address gates designated AG1–AG$x$ supply an $x$-bit pattern which represents the number of one of the processors to the MAR. The processor number may be supplied to the address gates AG1–AG$x$ through any one of three different sets, each of $x$ AND gates, depending on the source which supplies the processor number to the address generator 50 and which is to be used in generating the PQ address.

The first set of gates designated S1–Sx is enabled to supply the processor number present on lines SL1–SL$x$ of the SLB only when an Enable SLB signal is supplied thereto from the control unit 65 via line 130. The second set of $x$ AND gates designated S'1–S'$x$ is enabled to supply the processor number, present on lines CCL1 through CCL$x$, which together form the CCB only when an Enable CCB signal is supplied from the control unit 65 via a line 132. Similarly, the third set of $x$ AND gates, designated S''1 through S''$x$, is enabled by an Enable PNCTR signal supplied from the control unit 65 via line 134 to generate the address of the PQ word as a function of the processor number which is supplied on the $x$ output lines of PNCTR 60.

Thus for the PQ address generator 50 to generate the full address of a PQ word a control signal need be supplied to its fixed $y$-bit pattern generator and an Enable signal has to be supplied to one of the three lines 130, 132 and 134 to control which of the three possible sources of a processor number which are connected to the generator 50 is used to provide it with a processor number.

A similar arrangement may be employed in JQL address generator 55 to generate the address of one of the JQL words in section B as a function of a job number (JN) which is supplied to generator 55. Such a number may be supplied thereto from any of the fields of the two working registers PQR and QLR shown in FIG. 13 beneath the Figure identification or via the JNB.

As previously explained in the instant invention, it is assumed that the JC starts performing its three-cycle operation upon receiving a Select Signal from gate 125 of Priority Logic 70 which occurs when a processor which needs service is selected and the number of the processor is present on the SLB. Upon receiving the Select Signal the JC Control Unit 65 (FIG. 13) starts supplying control signals which in essence causes the JC to operate in the Delete cycle. After completing the Delete cycle the Unit 65 supplies the control signals which are necessary to control the JC to operate in the Add cycle.

In the Delete cycle the JC deletes the job from the Q of the selected processor unless the selected processor is the Input processor PO, which as herebefore assumed, does not have a Q. When P0 is serviced it provides the JC with a job number and the processor number which is to be the first to operate on the job. Thus whenever P0 is serviced the Delete cycle is not required. For any other processor the Unit 65 must supply control signals to enable the deletion of the job number which may be at the top of the Q or at any other point therein.

Figure 20:
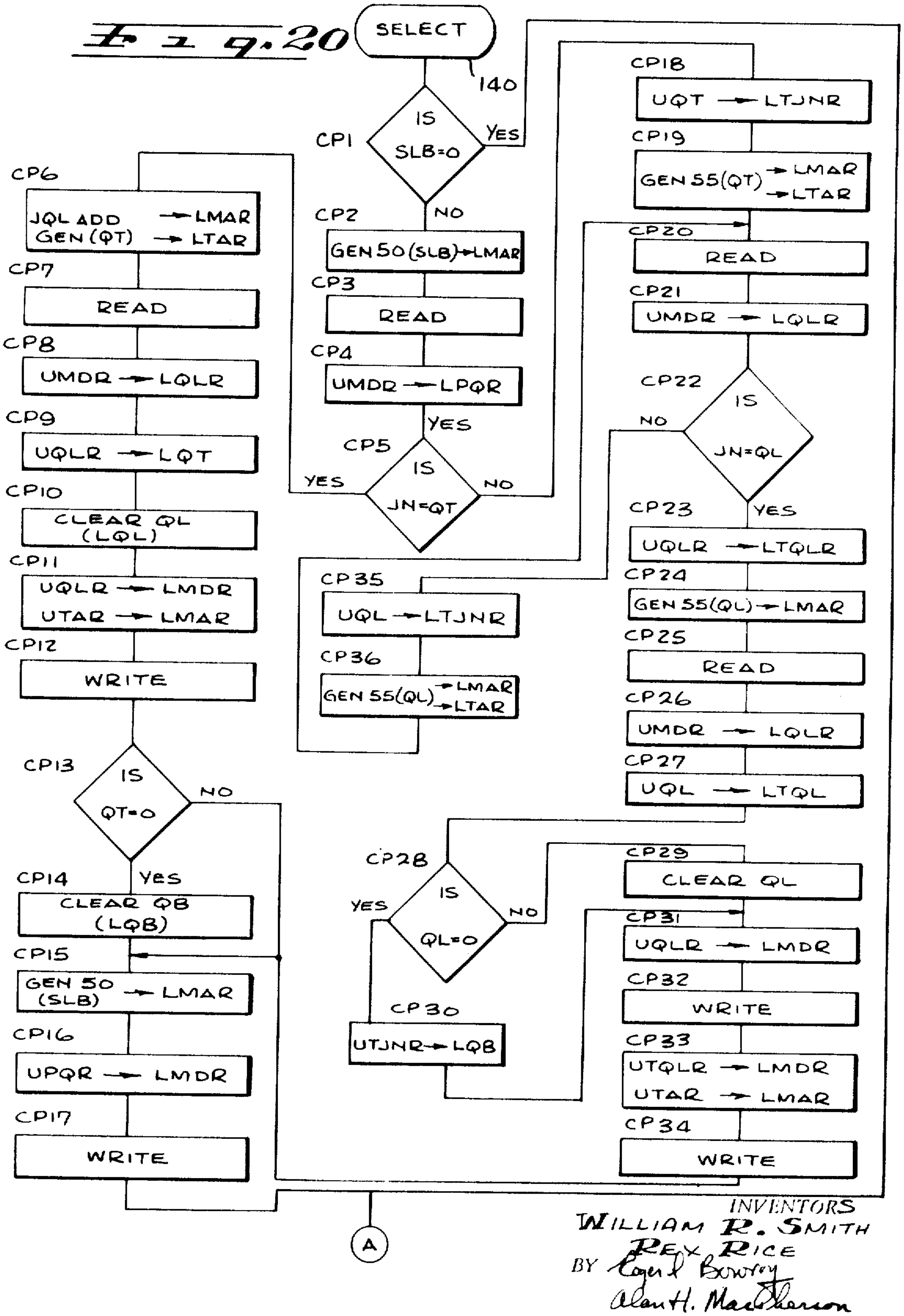
FIG. 20 is a flow chart representing the various steps which the Job Controller performs during a typical Delete Cycle operation in response to various control signals received from the Control Unit 65 shown in FIG. 13.

Reference is now made to FIG. 20 which is a flow chart representing the various steps which the JC performs during a typical Delete cycle operation in response to various control signals received from the JC Control Unit 65. Unit 65 is assumed to include a clock with a plurality of clock period defining logic circuitry such as flip-flops to define a succession of clock periods hereafter designated CP1, CP2, etc. The control signals include an Unload signal, a Load signal, which may be supplied to any of the registers shown in FIG. 13 or to any field thereof. Control signals also include Enabling signals for the address generators 50 and 55 to control them to generate addresses of PQ or JQL words as the case may be. The control signals also include Write and Read signals which are supplied to the RAM 15. In FIG. 20 as well as in the other flow charts to be described hereafter, the entries in each block indicate the type of signals which Unit 65 supplies during the CP associated with the block, thereby defining the step which the JC performs during the particular CP. Also in the various flow charts to be described, rectangular shaped blocks indicate steps during which the content of one register or generator is transferred to another register or a part thereof, while the diamond shaped blocks indicate interrogations or comparisons between the content of two fields.

As seen from FIG. 20, as soon as the control unit 65 is provided with the Select signal represented by the oval shaped block 140, the first clock period CP1 is defined, during which the SLB is interrogated to determine whether the processor number therein is equal to zero. It is equal to zero only if the Selected processor is the Input processor P0 which, as hereinbefore explained, does not require the performance of the Delete cycle. If SLB is equal to zero, i.e., the interrogation result is "YES," the JC automatically moves in its sequence of operations to point Ⓐ which represents the end of the Delete cycle and the start of the Add cycle. If, however, SLB is not equal to zero which will be the case whenever the Service processor is other than the Input processor, it is necessary to delete the job number received therefrom, which represents the job for which a task was just performed from the processors queue. The first series of steps performed during CP2–CP4 involves the retrieval of the processor's PQ word from the RAM 15 and its temporary storage or loading in the working register PQR. As shown, during CP2, the control unit 65 supplies an Enabling signal to generator 50 to generate the address of the PQ word of the Selected processor. The processor's number on the SLB is used to generate such an address which is loaded into the LMAR. The activation of the generator 50 to generate a PQ address as a function of the processor number on the SLB is represented by the entry GEN 50 (SLB). The transfer of the address from generator 50 to the MAR is represented by the arrow, while the control signal representing the loading of the MAR is represented by LMAR. Once the address of the PQ word of the selected processor is in the MAR a Read control signal is supplied to RAM 15 during CP3 resulting in the loading of the PQ word into the MDR. Then during CP4 the MDR is unloaded (by a control signal represented by UMDR) and the PQ word unloaded therefrom is loaded or stored into the PQR in response to a control signal from unit 65 represented by LPQR. Thus at the end of CP4 the PQ word of the selected processor is in PQR. Interrogation is then made during CP5 to determine whether the job number JN is equal to the job number contained in the field QT of PQR. The two numbers are equal only if the job to be deleted is at the top of the queue of the selected processor. This is the case in the foregoing described example of the operation of the JC at start time period $t6$ in which the JC has to delete J3 which is at the top of Q3 of P3.

If JN is equal to QT, i.e., the interrogation result is YES, the job number in QT such as J3 in the example is used to retrieve words JQL3 from memory and load it into QLR. In the particular example this is performed during CP6, CP7 and CP8. During CP6 unit 65 enables JQL address generator 55 to generate a JQL address as a function of the job number in QT, represented by an entry GEN 55(QT) and load the address in both the MAR and the TAR. The address (of J3) in the MAR is then used by the RAM 15 during a Read cycle to store JQL3 in the MDR and thereafter during CP8 the MDR is unloaded and the QLR is loaded with JQL3.

Figure 10:
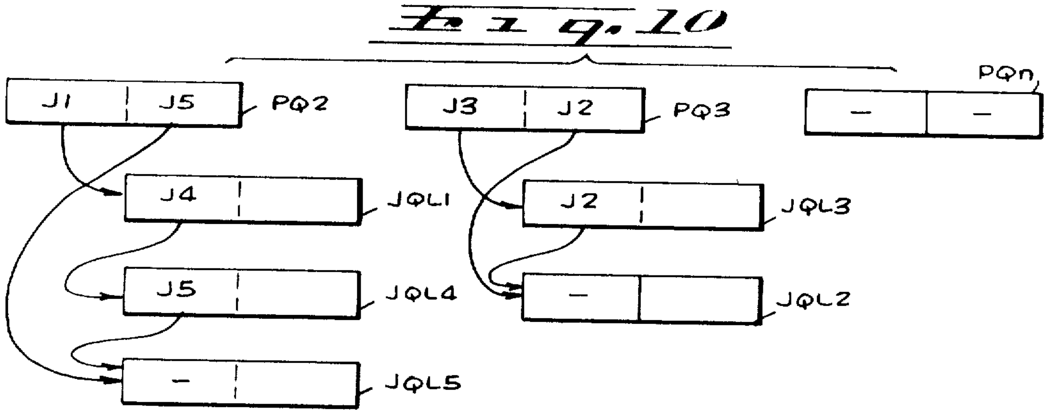

As seen from FIG. 10, prior to the deletion of JQL3 from Q3 the QL field of JQL3 contains the job number J2, pointing to another job number in Q3. Since only JQL3 has to be deleted from the queue the content of the field QL or QLR has to be transferred to the field QT of PQR. This is accomplished during CP9 when an Unload QL (UQL) signal is supplied by unit 65 to the field QL of QLR and a Load QT (LQT) signal is supplied by unit 65 to the field QT of PQR.

If each JQL word were only comprised of a QL field it would not be necessary to restore the deleted JQL word into the memory matrix of RAM 15. However, since as hereinbefore assumed, each JQL word contains a field in which various coded flags are stored (see FIG. 2) it may be necessary to return the deleted word to memory. In FIG. 20 the steps needed for such transfer are represented by the blocks associated with CP10 through CP12. Since after the deletion of a JQL word from a queue, the content of its QL field, which may represent a job number of another job in the queue for which the JQL word was just deleted is no longer necessary, the QL field is cleared during CP10.

The clearing of a field may be accomplished by providing the field with a Load signal without supplying an Unload signal to any of the other fields of the registers in the JC. Thus the entry CLEAR QL shown in the block associated with CP10 in FIG. 20 may be assumed to represent a Load QL (LQL) signal, shown in parenthesis therein. After clearing the QL field during CP11 the JQL word is unloaded from QLR and loaded into the MDR while the address of the JQL word which was stored during CP6 in the TAR is transferred to the MAR by unloading the TAR. Then the JQL word is written into memory during CP12.

Once the deleted JQL word is returned into memory it is necessary to return the PQ word into memory. However before this can be done it is necessary to determine whether the deleted JQL word was also the last word in the queue, in which case it is necessary to update the QB field of PQR. Such is the case in the example previously explained in conjunction with FIGS. 9 and 10 in which it is assumed that during time period $t4$, Q$n$ of P$n$ only contains JQL1 (see FIG. 9) and that at the start of time period $t5$, JQL1 is deleted from Q$n$ thus emptying the queue (see FIG. 10). If the JQL which is deleted from the top of a queue is also the last in the queue during CP9, the content which is loaded into QT is zero.

Thus during CP13 the content of QT is interrogated by being compared to see if it is equal to zero. If it is, thereby indicating that the deleted JQL in addition to being the one at the top of the queue was also the last in the queue, during CP14 a clear QB signal is supplied to the QB field of PQR, thereby clearing the field. If, however, QT is not equal to zero thereby indicating that the deleted JQL is not the last in the queue, it is not necessary to change the QB field. Consequently after the interrogation during CP13 the JC performs the steps represented by the entry in the block associated with CP15, followed by the steps executed during CP16 and CP17. Basically, during the three last-mentioned clock periods, the PQ word stored in PQR is returned and rewritten into the memory matrix at an address provided by GEN 50. The end of CP17 represents the end of the Delete cycle.

If, however, during CP5 JN is not equal to QT, i.e., the job number to be deleted is not at the top of the queue, it is necessary to perform a series of steps by sequentially retrieving various JQL words from memory until the number of the job which is to be deleted from the queue is located in one of the JQL words so as to enable the deletion of its JQL word from the queue. Such an operation is, for example, necessary when attempting to delete at the start of time period $t7$ J4 from Q2, an operation which herebefore has been described in conjunction with FIGS. 11 and 12. As seen from FIG. 11 JQL4 is not located at the top of Q2 but rather is the third in the list of JQL words in the queue. Thus to delete JQL4 from the queue it would be necessary to first retrieve JQL3 and after determining that its QL field does not contain J4, since as shown in FIG. 11 it contains the number J1 it would be necessary to retrieve JQL1. Only when the QL field of JQL1 is interrogated, finding that it contains the desired number J4, can JQL4 be retrieved from memory. Then it is necessary to replace the content of the QL field of JQL1 containing J4 which is to be deleted with the content J5 of the field QL of JQL4 which is to be deleted in order to provide the proper linkages between JQL1 and JQL5 as shown in FIG. 12.

Assuming that at CP5 JN is not equal to QT, i.e., the job number to be deleted is not at the top of the queue, CP18 is defined during which the job number in QT is loaded into a Temporary Job Number Register (TJNR) for temporary storage. As will be appreciated from the following description, this job number may be necessary for the updating of the QB field if the job number to be deleted is any but the top number in the queue. During CP19–CP21 the job number of the top queue in QT is used in generating the address of the JQL word at the top of the queue which is loaded into QLR. Then during CP22 JN is compared with the job number in QL. If the job to be deleted is the second in the queue the results of this comparison or interrogation will be positive, i.e., YES, as a result of which during CP23 the content of QLR is transferred to TQLR.

Then during CP24–CP26 the JQL word of the job to be deleted is retrieved from memory and stored in the QLR. Then at CP27 the content of QL, which at this point represents the job number following the job which is being deleted in the queue, is transferred to the QL field of the TQLR. This field is designated by TQL and the load signal which is supplied thereto is represented by LTQL. Thus at this point in the operation the JQL word to be deleted is in the QLR register and the JQL word preceding the one to be deleted is in the TQLR with its QL field already updated.

At this point in the operation it is necessary to determine whether the job number to be deleted is the last in the queue. If it is it would be necessary to update the QB field of the PQ word to point to the job number of the JQL word associated with such job number which precedes the one being deleted. Thus after CP27 the content of QL is interrogated during CP28 to determine whether it is equal to zero. It is not equal to zero if the job being deleted is not the last in the queue and therefore it is not necessary to update the QB field. Consequently after CP28 during CP29 the QL field is cleared. If, however, QL is equal to zero during CP30 the job number in TJNR, which represents the number of the job preceding the one being deleted, is loaded into QB since after the deletion the latter will represent the last number in the queue.

After CP29 or CP30, periods CP31 and CP32 follow in succession during which the JQL word being deleted is rewritten into memory at the address generated during CP24. Then the JQL word preceding the one which was deleted is returned to memory by returning its content from TQLR to the MDR and generating its appropriate address present in the TAR, followed by a Write operation during CP34. Thereafter the PQ word is returned to memory by performing the steps hereinbefore explained to occur during CP15 through CP17. If, however, during CP22 the JQL word at the top of the queue does not contain in its QL field a number which is equal to the job number, the JC control unit 65 proceeds to define a clock period 35 during which the content of the QL field of the QLR register is loaded into the TJNR.

Thereafter, during CP36 the job number in the QL field is used to generate an address of a JQL word which is supplied both to the MAR and the TAR. This step is followed by the Read step performed during CP20. This operation will continue until at some point in the queue the QL field of one of the JQL words will contain a job number equal to the job number which is to be deleted, in which case the sequence of steps will proceed with the steps performed during clock period 23 and succeeding clock periods.

Figure 21:
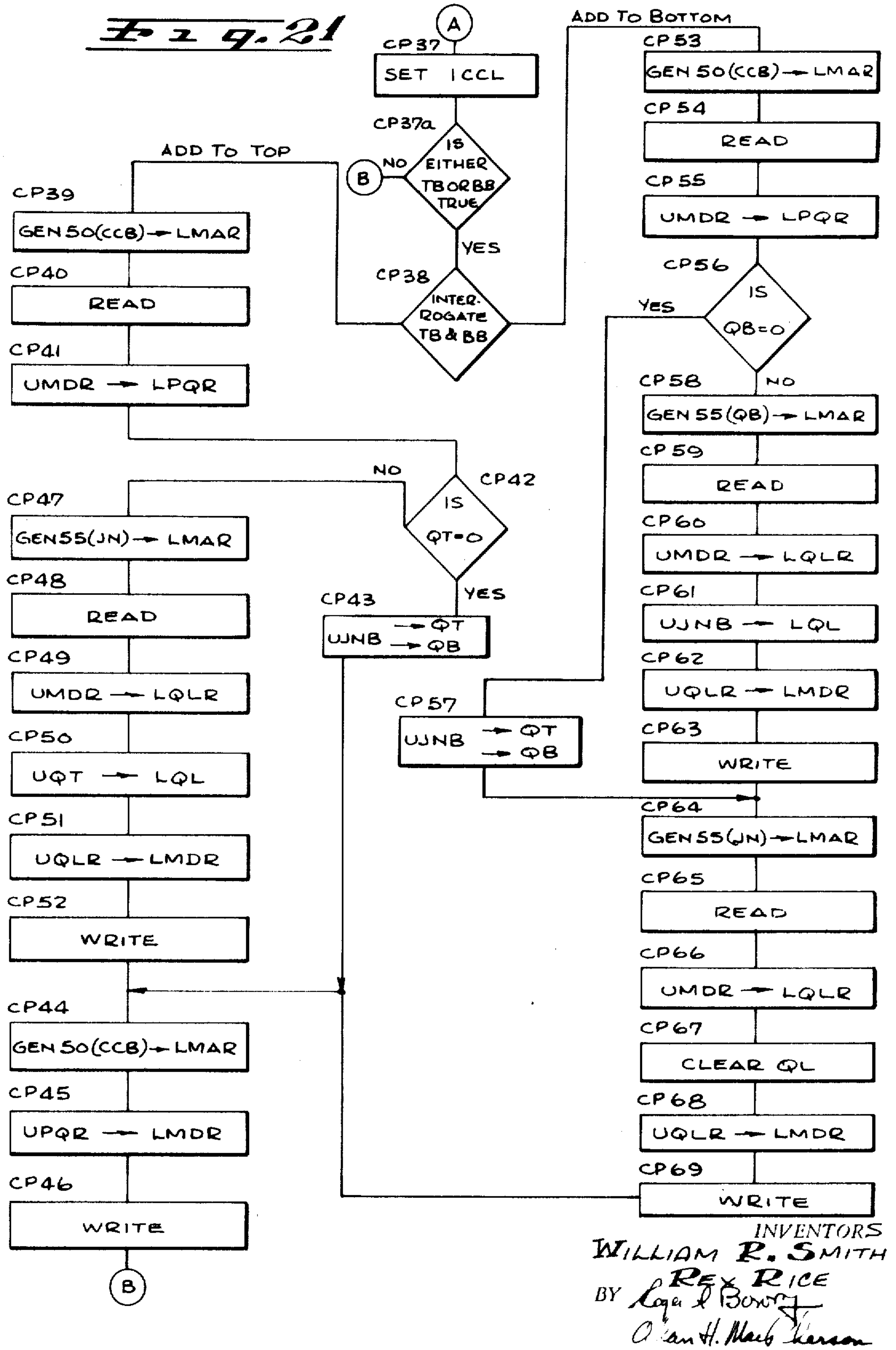
FIG. 21 is a flow chart diagram representing the sequence of steps which the Job Controller performs during the Add cycle of its operation.

Reference is now made to FIG. 21 which is a flow chart diagram representing the sequence of steps which the JC performs during the Add cycle of its operation. As herebefore explained, during the cycle the job number supplied by a service processor is added to its queue. The job number may be added to the top of an existing or an empty queue or to the bottom of an existing or empty queue. Whether it should be added to the top or bottom of the queue is determined by the state of the T–B bit of the CCR which is supplied to the control unit 65, as hereinbefore explained in conjunction with FIGS. 13 and 14. However, in order to unload the CCR and the job number from the JNR (see FIG. 14) it is necessary to set the ICCL. This is accomplished by the control unit during a clock period CP37. Then during CP38 the binary state of the T–B bit of CCR which is supplied to the control unit 65 is interrogated.

Assuming that it is in a binary one state, thereby indicating that the job number should be added to the top of the queue, the PQ word associated with the processor being serviced whose number is available on the CCB is retrieved from memory during CP39 through CP41. Once the PQ word is in the PQR its QT field is interrogated to see whether it is equal to zero during CP42. If it is zero it indicates that the queue to which the job number is added was previously empty. Consequently the job number on the JNB is unloaded into both the QT and QB fields of PQR during CP43. Then the PQ word is returned back to memory by the steps performed during CP44 through CP46.

If, however, during CP42 it is found that QT is not equal to zero, i.e., a valid queue is in existence, the new job number is added to the top of the existing queue by first retrieving the JQL word associated with the job number and placing it in the QLR. This is performed during CP47 through CP49. Then the content of the QT field is transferred to the QL fields of QLR during CP50, followed by restoring the JQL word of which was newly added to the queue in the memory during CP51 and CP52. Then the PQ word is returned to the memory during CP44 through CP46 as hereinbefore explained.

The foregoing described steps represent all the steps necessary to add a job number by adding its JQL word to the top of either an existing queue or an empty queue as the case may be. If, however, during CP38 the T–B bit of CCR indicates that a job number should be added to the bottom of the queue, CP38 is followed by CP53 through CP55 during which the PQ word of the selected processor which is being serviced is retrieved from memory and loaded into the PQR. The address of the PQ word is generated by using the processor number present on the CCB. Once the PQ word is in the PQR its QB field is interrogated during CP56. If the QB is zero thereby indicating that the queue was previously empty during CP57, the JC control unit 65 provides controlled signals which result in transferring the job number on JNB to each of the fields QT and QB of the PQR. That is, the job number which now forms the only one in the previously empty queue is entered into the two fields of the PQ word.

If, however, the QB is not equal to zero, i.e., queue is in existence, the content of the QB representing the job number of the last job in the queue, is used during CP58 to generate the address of the JQL word associated with the last job number, followed by periods CP59 and CP60 during which the JQL word is read out and loaded into the QLR. Then, the JNB is unloaded to supply the job number which is being added to the QL field in the QLR in which the JQL word of the previously bottom job number is located. This transfer occurs during CP61. Thereafter, the previous last JQL word is returned to memory during CP62 and CP63.

Following either CP57 or CP63, the control unit 65 provides control signals to retrieve the JQL word of the job number which is being added to the bottom of the queue in order to clear its QL field, since as hereinbefore explained, the QL field of the JQL word at the bottom of a queue does not contain any meaningful job number. This is accomplished by the various control signals supplied by the control unit during CP64 through CP69. The latter clock period is followed by the periods such as CP44 through CP46 during which the PQ word is restored into memory to complete the Add cycle mode of operation, represented by Ⓑ.

Figure 22:
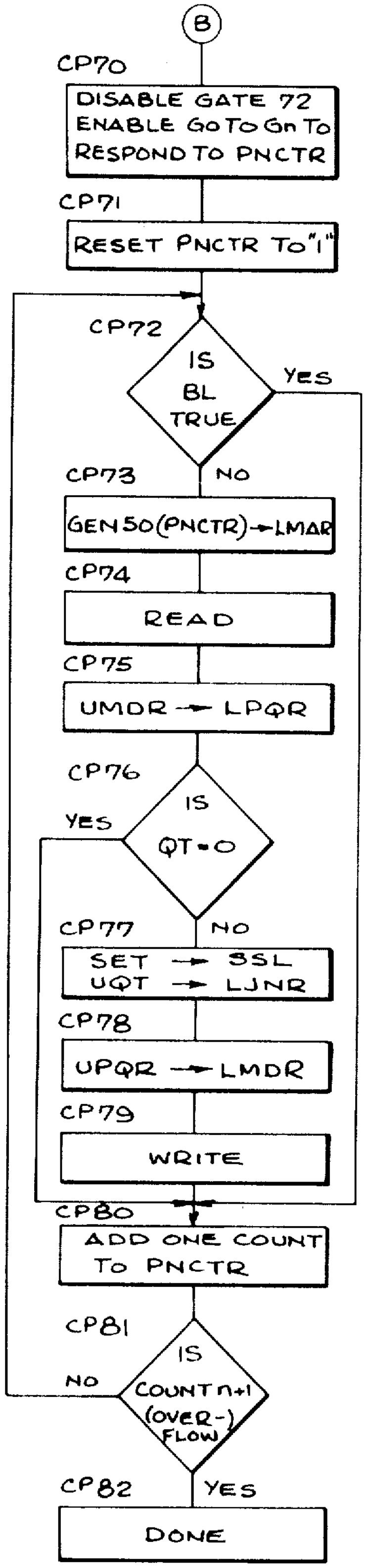
FIG. 22 is a diagram in flow chart form showing the steps required to perform the Assign Job cycle of operation.

After completing the Add cycle, the JC automatically assumes the performance of the Assign Job cycle, which is the third cycle in its mode of operation, and which is diagrammed in flow chart form in FIG. 22. It should be pointed out that during the first two cycles, the number of the selected processor appearing on the SLB is used to enable gate 72 which in turn enables the gate unit G of the selected processor. However, during the Assign Job cycle it is necessary to access and assign a job to each nonbusy processor, an operation which involves the interrogation of each of the processors (except P0). Thus in accordance with the teachings of the present invention it is assumed that during the Assign Job cycle of operation gate 72 is disabled and the output number from PNCTR is used to enable the gate G corresponding to the output number of the PNCTR.

It is for this reason that at the start of the Assign Job cycle during CP70 the control unit 65 supplies a disabling signal to gate 72 and enables one of gates G0–G$n$ to respond to the output of PNCTR. Thereafter during CP71 the PNCTR is reset to a count of 1, i.e., it is reset so that its output represents a one (1) in binary form, which in turn enables gate G1 associated with processor P1. The reason that the PNCTR is not reset to zero is that hereinbefore it has been assumed that processor P0 is the input processor to which no job need be assigned. As hereinbefore explained, P0 is used to supply the system with the necessary control words for each job and a request for the particular job. When performing this task the task of P0 as related to a particular job is completed.

Once the PNCTR is set to 1 it enables the JC to communicate with the processor P1. To determine whether P1 is not busy and therefore in condition to receive the assignment of a task, the processor's BL line is interrogated during CP72 to determine whether it is true or not. As hereinbefore assumed, a processor is assumed to be busy if its BL representing the output line of busy flip-flop 97 (see FIG. 14) is true. If the processor is not busy, i.e., its BL is not true, it is in condition to receive the assignment of a job. Assuming that the interrogated processor is not busy, a determination made during CP72, during CP73 through CP75, the processor's PQ word is retrieved from memory and loaded into the PQR. The output of PNCTR representing the processor being interrogated is used to enable generator 50 to generate the address of the PQ word of the interrogated processor during CP73.

After CP75, during CP76, when the PQ word of the interrogated processor is in the PQR its QT field is interrogated to determine whether it is zero. As previously explained, this field is zero only if the particular processor's queue is empty. Assuming that the queue is not empty, i.e., the result of the interrogation of QT=0 is NO, a job is assigned to the nonbusy interrogated processor by assigning thereto the number in the QT field. This is accomplished during CP77 by setting the SSL of the interrogated processor and by unloading the QT field while loading the JNR of the PC associated with the processor to which a job is assigned.

As a result the job number from the QT field representing the number at the top of the queue is loaded into the JNR and by setting SSL, line 100 (see FIG. 14) is set to true. This serves to indicate to the control logic unit 91 of the processor that a job has been assigned thereto and it is in condition to resume the performance of the task thereon. Thereafter during CP78 and CP79 the PQ word of the processor to which a job was just assigned is rewritten into memory. This completes the assignment of a job to a processor. Then during CP80 the count in PNCTR is incremented by one. Thereafter during CP81 the count is interrogated to determine whether the counter has reached an overflow count.

In the present example, assuming that the processor with the largest number is $n$, an overflow count would be represented by a $n+1$ count. If the count represents an overflow condition it indicates that the last processor has been interrogated and a job may have been assigned thereto thereby indicating the completion of the Assign Job cycle. Consequently, during CP82 the control unit 65 supplies A DONE signal which as shown in FIG. 15 is supplied to flip-flop 122 to set it. As a result a Load Select Register (LSR) signal is supplied to register 120 to enable it to respond to a request for servicing of another processor. If, however, during CP81 the output of PNCTR does not represent an overflow condition, the busy or nonbusy state of the processor whose number is represented by the output of PNCTR is interrogated by repeating the interrogation of the status of the BL, as previously explained in connection with CP72.

It should be appreciated that if during the interrogation of the BL of any processor which takes place during CP72 the BL is found to be true, thereby indicating that the interrogated processor is busy, no job can be assigned thereto. Therefore the sequence of steps proceeds to perform the incrementing of the PNCTR during CP80. It should also be pointed out that during the interrogation performed during CP76, if the QT field is found to be zero, i.e., the queue of the interrogated processor is found to be empty, it is not possible to assign a job thereto since none is included in its queue. Therefore the system also proceeds to perform the incrementing of the PNCTR during CP80. This completes the description of the Assign Job cycle of operation which is the third of the three cycle mode of operation thereof.

From the foregoing description it should thus be appreciated that the novel JC of the present invention which is assumed to be operable in a three-cycle mode of operation is capable of controlling the flow of a job between a plurality of processors in a time-shared multiprocessor system until the job is completed. The JC is further capable of assigning jobs in sequence to each processor so as to enable the processor to sequentially perform its task on the various jobs which need its services. If two processors complete the performance of their tasks on different jobs simultaneously and request services from the JC, i.e., the assignment of new jobs thereto, the JC includes a priority logic arrangement to insure that the processor with a higher priority is serviced first.

In the foregoing described embodiment it has been assumed that when a processor provides a Needs Service signal to the JC, the JC automatically deletes the job number on which the serviced processor previously performed a task from the processor's queue and that the job number is added unconditionally to only the queue of one processor. Also in the foregoing, it has been assumed that for each type of task to be performed on a job the system only incorporates a single processor for that type task. In accordance with the teachings of the present invention, the foregoing described three-cycle mode of operation of the JC may be modified, depending on particular system requirements.

For example, as will be explained hereafter in detail, the JC may be operated to respond to a completion code so that during the Add cycle a job number received from a serviced processor is added to the queue of another processor only if a certain condition or set of conditions are satisfied. Also, the JC may be modified so that during the Add cycle, depending on the particular completion code (cc) received from the serviced processor, the job number which has been deleted from the queue of the serviced processor during the Delete cycle may be added to two different queues of two different processors. Another modification which may be made in the basic three-cycle mode of operation of the JC is to include the capability to respond to a request for service from a processor to deactivate the job previously assigned thereto without removing it from the processors' queue, yet assign a new job number thereto during the third, i.e., the Assign Job cycle of operation.

For example, let it be assumed that during a certain time period the queue of a processor includes job J1 and J2 and that the processor is performing a task for J1. Let it further be assumed that as it performs this task a job J3 is added to the top of the queue so that it consists of J3, J1 and J2. Then let it be assumed that the particular processor requests that the job J1 on which it has operated be deactivated without being deleted from its queue. In such a case the JC will not delete J1 from the queue, yet during the third Assign Job cycle of operation it will assign the top job, i.e., J3 to the processor.

Such a capability is particularly desirable in circumstances in which a processor can not complete the performance of a task for a given job due to particular circumstances. In such a case the processor may not want to delete the job from its queue, but rather may want to maintain it in its relative position in the queue to enable it to resume performing the task on the particular job as soon as the particular circumstances no longer exist.

Another modification in the basic three-cycle mode of operation of the JC may be made in order to enable the JC service several identical processors of the same type, i.e., processors which perform identical tasks and assign jobs to each one of them from a common queue in which all the jobs which at any point in time require the performance of such tasks as part of their execution are included.

Among still other modifications which may be made without departing from the spirit of the invention is one in which the assignment of a job number to a processor during the Assign Job cycle can only take place if the job is assumed to be assignable, as hereinafter defined.

In any given multiprocessor system the assignment of a job to a processor may be made dependent on various reasons or conditions which may arise therein. For example, in a typical multiprocessor system, all the data is generally stored in a relatively inexpensive low-speed memory, hereafter referred to as a virtual memory, while the data which is being processed at any given time is located in a high-speed random accessible memory into which the data was transferred from the virtual memory. In such an arrangement the assignment of a job to a processor may be made conditional on the presence of all the jobs' data in the high-speed memory. If however, some or all of its data is in the virtual memory, it may be desirable to inhibit the assignment of the job to a processor until all required data is transferred to the high-spped memory.

Conditioning assignability of a job may be accomplished by controlling the binary state or states of one or more flags in the job assignability field (JAF) of the JQL word of each job number (see FIG. 2). For example, flag F1 may be set to true whenever the job should not be assigned for one reason or condition, while flag F2 may be set to true to inhibit the assignment of a job, depending on the existence of another condition, Thus, before a job can be assigned it would be necessary to interrogate the JAF to determine that all its flags used to control the assignment of the job are false or invalid.

Figure 23:
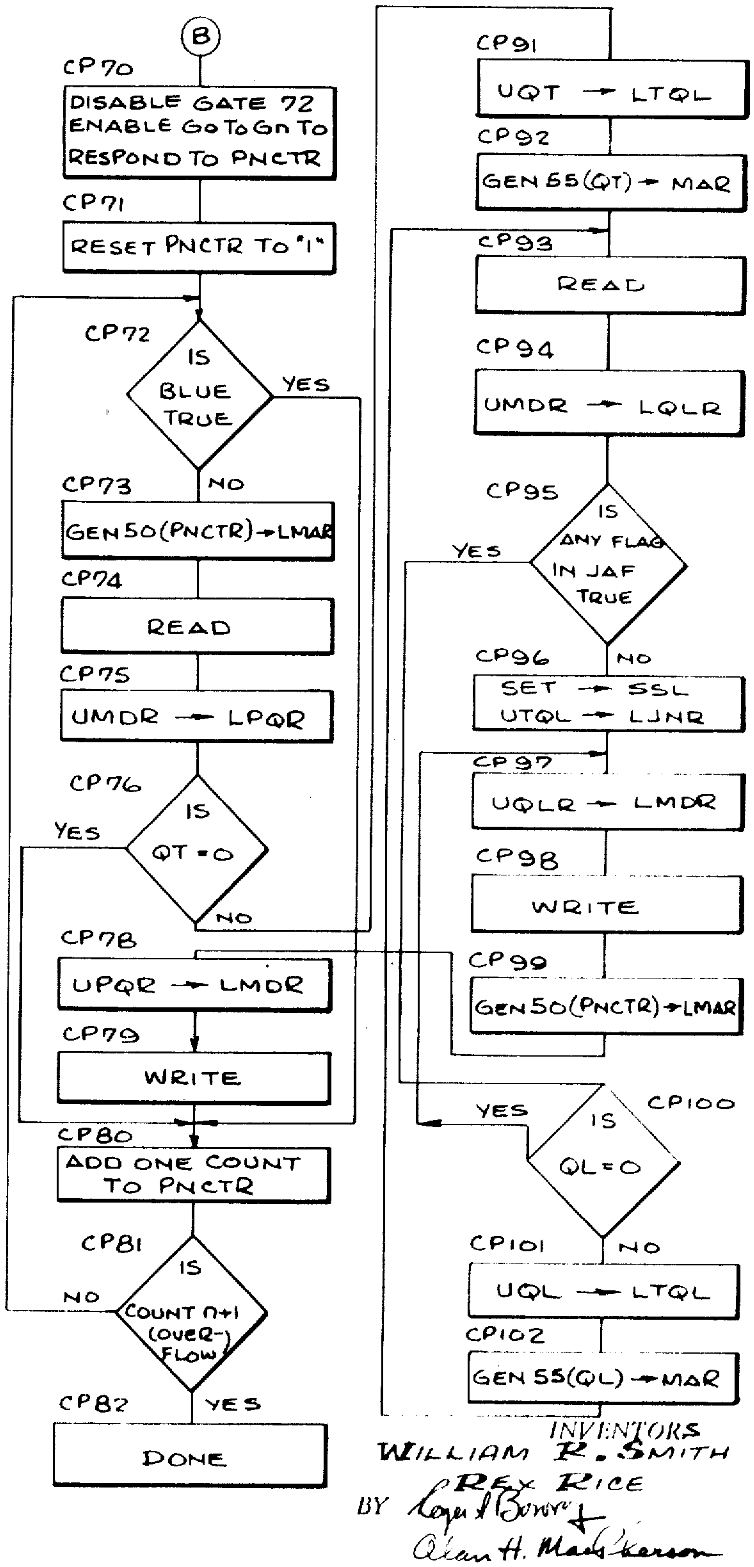
FIG. 23 is a flow chart of another embodiment similar to the Assign Job cycle.

The manner in which such flags are used may best be explained in conjunction with FIG. 23 which is a flow chart similar to the one shown in FIG. 22, except that in the former the Assign Job cycle includes the interrogation of the JAF of the JQL word of a job before it can be assigned to a processor. As seen from a comparison of FIGS. 22 and 23 in FIG. 22, once the QT is found not to be equal to zero during CP76, i.e., the processor it which the job is being assigned is found to possess a queue which has at least one job number therein, the top job number in the queue is assigned thereto. However, in the arrangement in which the assignment of a job may be conditional after determining that the processor has a queue, it is necessary to retrieve the JQL word associated with the top number in the queue and determine whether any of its flags in its JAF is true. Only when all the flags are false, thereby indicating that the job is assignable, can the job be assigned to the processor.

In the simplified flow chart of FIG. 23, after CP76, assuming that the processor which is being serviced has a queue, i.e., QT is not equal to zero, the content of the QT is temporarily loaded into the TQL during CP91. The content of QT represents the top job number in the queue. This content is used to retrieve the JQL word of the top job by the steps performed during CP92 through CP94. Then during CP95 the JAF field is interrogated to determine whether any of the flags therein is true. If none of the flags is true, thereby indicating that the top job in the queue is assignable, the SSL is set during CP96 and the content of TQL representing the top job number is loaded into the JNR. This in a sense completes the assignment of the top job number in the queue to the processor. Thereafter during CP97 and CP98, the JQL word of the job just assigned is rewritten into memory. Then during CP99 the address of the PQ word is generated by the PQ word located in the PQR is restored into memory during CP78 and CP79. The latter step is followed by steps previously explained.

If, however, during CP95 one of the flags in the JAF of the JQL word is true, thereby indicating that at least one condition is present which prevents the assignment of the job, the sequence proceeds to interrogate the QL during CP100 to determine whether it is equal to zero. If the QL is zero, thereby indicating that the JQL word whose JAF was interrogated during CP95 in the last in the queue, the sequence proceeds with the step performed during CP97 and the following steps to restore the last JOL word and the PQ word as hereinbefore explained. If, however, during CP100, QL is not zero, thereby indicating that the JQL word is not the last in the queue, the content of QL is temporarily stored in the TQL during CP101. Thereafter during CP102 the content of QL is used by generator 55 to generate the address of the next JQL word, a step followed by a Read operation during CP93 and the following steps.

From the last described flow chart modification it should thus be apparent that whereas in accordance with the teachings described in connection with FIG. 22 is has been assumed that any processor which is not busy has the top job in its queue assigned thereto, in the modified arrangement, a job can be assigned to a nonbusy processor from the queue only if the job is assignable, i.e., none of its flags in the JAF is true. Thus a situation may exist in which a nonbusy processor has a queue of one or more job numbers, yet none of them is assignable thereto if each one of the jobs, for the same or different reasons, is not assignable as indicated by at least one true flag in the JAF of each one of the JQL words in the queue.

Figure 24:
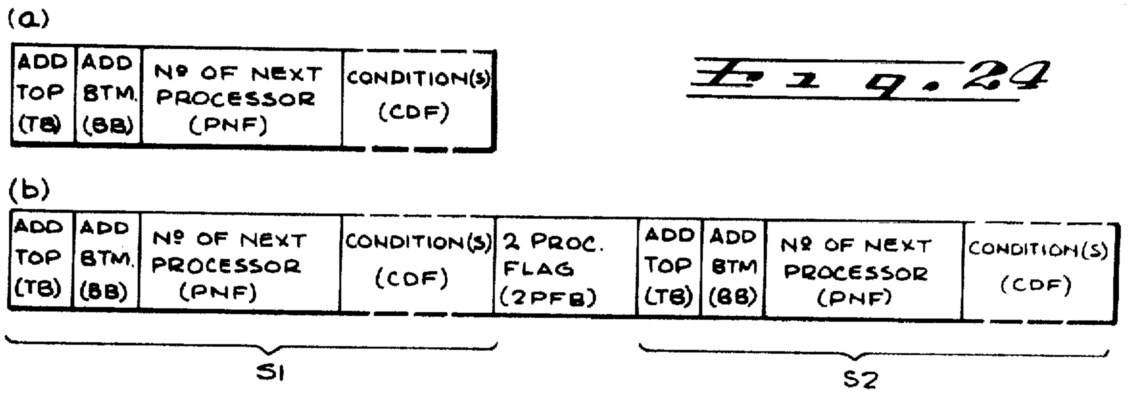
FIGS. 24(*a*) and 24(*b*) are diagrams in format form of two embodiments of a Completion Code Register.

Before proceeding to describe various ones of the aforementioned modifications of the basic operation of the JC, reference is made to FIG. 24. Therein (*a*) represents the basic format of the Completion Code Register (CCR) which is included in each processor controller, as hereinbefore described in conjunction with FIG. 14, As previously explained as part of the completion of a task by a processor, the processor loads the CCR of the PC associated therewith with the number of the next processor which has to perform its task on the job. The processor also indicates whether the job number should be added to the top or to the bottom of the queue of the next processor. Thus, as diagrammed in FIG. 24 (*a*), the basic CCR includes a Processor Number Field (PNF) in which the number is entered, and Add Top bit (TB) and an Add Bottom bit (BB). Either of the two is set to store a binary 1, depending on whether the JN is to be added to the top or to the bottom of the queue of the next processor. If the addition of the job number to the queue of another processor may be made conditional upon the existence of one or more conditions, the CCR may be made to include an additional field, hereafter referred to as the Condition Defining Field (CDF) in which data defining such conditions may be entered.

As previously briefly indicated, the JC may be modified to respond to a completion code from a processor indicating that a job number for which the processor just performed a task should be added to queues of two different processors. To accommodate such a capability in accordance with the teachings of the present invention, each CCR may assume the format as shown in FIG. 24 (*b*). In such an arrangement, the CCR includes two identical sections, each one including a TB, a BB, a PNF and a CDF. These two sections are designated S1 and S2. In addition, the CCR will include an additional bit which serves as a Two processor Flag Bit (2PFB). This bit may be assumed to be false whenever the CCR is loaded with a number of one processor only. On the other hand, the bit is true whenever a job number is to be added to the queues to two different processors, in which case both sections S1 and S2 of the CCR are loaded with different processors' numbers. The two sections, S1 and S2, may be thought of as two separate CCR's with an additional bit (2PFB) which serves as a flag to indicate whether one or both of the CCR's are loaded.

In such an embodiment, the Add cycle operation previously described in conjunction with FIG. 21 is slightly modified. Ignoring for a moment the possibility of conditional addition, at the start of the Add cycle the section S1 of the CCR is unloaded and the job number is added to the queue of the processor whose number is in the PNF OF S1. Then, after returning the PQ word of the particular processor to memory, as represented by the Write step performed during CP46 in FIG. 21, instead of proceeding directly to the third cycle, i.e., the Assign Job cycle of operation in the double addition situation, the 2PFB bit is interrogated. If it is true, thereby indicating that the job number is to be added to the queue of another processor whose number is available in the PNF of section S2 of the CCR, section S2 is unloaded and the Add cycle is merely repeated.

Figure 25:
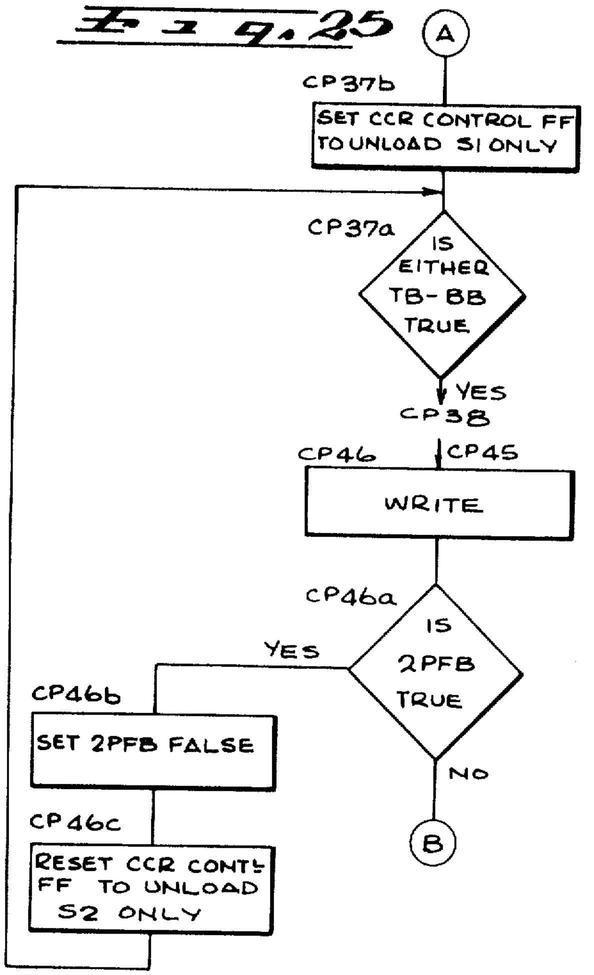
FIG. 25 is a modified partial flow chart of the Add cycle employed in an embodiment in which a job number may be added to two processors' queues.

The minor modifications which have to be made in the Add cycle may best be explained in conjunction with FIG. 25 which is a modified partial flow chart of the Add cycle, employed in an embodiment in which a job number may be added to two processors' queues. In such an arrangement, at the start of the Add cycle represented by Ⓐ, instead of setting the ICCL during CP37 as shown in FIG. 21, the CCR is activated so that initially only section S1 is unloaded. This may be accomplished by setting a CCR control flip-flop (FF) to unload S1 only, a step assumed to be performed during CP37*b* (see FIG. 25). Therefrom the sequence proceeds to perform the interrogation of TB and BB of S1 of determine whether either one of them is true, i.e., to determine whether a processor number is present to which the job number should be added. This interrogation is performed during CP 37*a* as shown in both FIG. 25 and in basic Add cycle flow chart of FIG. 21. Therefrom the Add cycle operation proceeds as hereinbefore described.

However, whereas in a basic Add cycle, after the Write operation performed during CP46 (see FIG. 21) the JC proceeds to the third cycle, i.e., the Assign Job cycle, in the present embodiment, following the Write operation the 2PFB (see FIG. 24) is interrogated to determine whether it is true. If true, the bit indicates that the job number should be added to the processor whose number is in the section S2 of the CCR. If, however, 2PFB is false thereby indicating that the job should only be added to the processor whose number is in S1, the Add cycle terminates as represented by the Ⓑ. Assuming that 2PFB is true, the sequence proceeds to set 2PFB to false during CP46*b* followed by resetting the CCR control flip-flop during CP46*c*. As a result section S2 if the CCR is unloaded. The latter step is followed by repeating the interrogation of TB and BB to find out whether either one of them is true. This is performed during CP 37*a*, followed by the rest of the steps which are necessary to repeat the Add cycle operation so as to add the job number to the queue of the second processor, i.e., the processor whose number is in the PNF of section S2 of the CCR.

Herebefore, in the description in connection with FIGS. 2 and 19 it has been assumed that for each job number a single JQL word and a single JC word are stored in memory. Such an assumption is only valid in embodiments in which a job number can be added only to the queue of one processor. However, in the embodiment in which it is assumed that a processor may indicate that a certain job number should be added to more than one queue, for example, two queues of two different processors, a separate pair of words consisting of a JQL word and a JC word is required for each queue to which the job number may be added.

Figure 26:
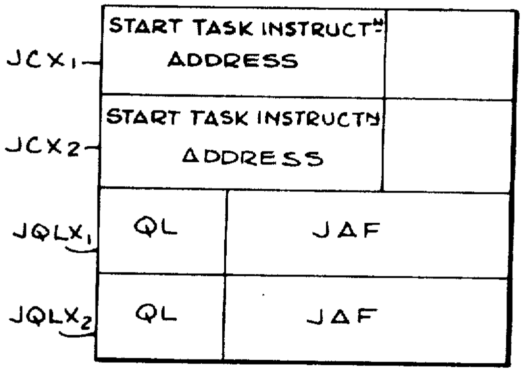
FIG. 26 is a format diagram of control words required for the embodiment in which a job may be added to two queues.

For the example in which a job may be added to two queues, two pairs of words, as shown in FIG. 26 to which reference is now made are required. Therein, $JQL_1$ and $JC_1$ represent one set, and $JQL_2$ and $JC_2$ represent another pair of words. The system may be controlled so that the control words designated by the 1 sub suffixes are utilized in the queue of the processor supplied to the JC in the section S1 of the CCR, while the control words designated by the 2 sub suffixes are employed in the addition of the job number in the queue of the processor, whose number is provided in section S2 of the CCR.

As herebefore briefly explained in connection with the CCR formats shown in FIG. 24, the addition of a job number to a queue of a next processor may be made conditional upon the existence of conditions defined by the content of the Condition Defining Field (CDF) of the CCR. This field may include a Conditional Addition Indicating Bit (CAIB) so that at the start of the Add Cycle this bit is interrogated to determine whether it is valid. It is only valid if the addition is made conditional, in which case the content of the rest of the CDF is utilized. In accordance with this content, various steps are performed to determine whether the conditions are present or met. Only if they are met does the JC proceed to actually perform the addition of the job number to the queue of the processor, whose number is in the PNF. If, however, the conditions are not met, the rest of the Add cycle is deleted and the JC proceeds to perform the Assign Job cycle. Clearly, if the Conditional Addition Indicating Bit (CAIB) is found to be invalid thereby indicating that the job addition is not conditional, the JC proceeds to perform the Add cycle as hereinbefore explained.

These modifications may be explained in conjunction with FIG. 27 which represents a partial flow chart of the Add cycle, wherein the interrogation of the validity of the CAIB is assumed to be performed during CP37*c*. If the bit is valid, i.e., the addition is conditional, during CP37*d*, the sequence proceeds to perform all the steps which are necessary to determine whether all the conditions for the addition are met. If they are not, the Add cycle is terminated as represented by Ⓑ. If, however, the conditions are met, the sequence proceeds to interrogate TB and BB during CP37*a*.

The partial flow chart of FIG. 27 is assumed to be used in an embodiment in which a job number may be added to one processor, since the start of the Add cycle is represented by the step of setting the ICCL, as is the case in the flow chart shown in FIG. 21. Clearly, however, the conditional addition modification may be incorporated in the embodiment in which the job number may be added to two processors' queues. In the latter case, the steps to be performed during CP37*c* and CP37*d* necessary to determine whether the addition is conditional and if so whether all the conditions are met will be incorporated between the steps performed during CP37*b* and CP37*a*, as shown in the partial flow chart of FIG. 25.

The mode of operation of the JC in an embodiment in which conditional addition as well as double addition capabilities are incorporated may best be summarized in conjunction with FIG. 28. This figure in chart form is used to represent the operation of the JC during a sequence of four time periods *t*9–*t*12 . Period *t*9 is assumed to follow *t*8, the last period diagrammed in FIG. 4. Time period *t*9 is diagrammed to indicate the addition of J3, which is first deleted from Q2 and P2 to both the top of Q3 and the top of Q*n*, thereby indicating the double addition situation. Time period *t*10 is included to indicate that the same number, for example J3, may be operated upon simultaneously by two different processors, for example P3 and P*n*.

Time period *t*11 is included to indicate the conditional addition. As seen from FIG. 28 at the start of period *t*11, P3 is serviced by deleting J3 from its queue. As indicated, this number should be added to the bottom of Q2 only if the P*n*'s task was completed. As seen in FIG. 28, during *t*10 P*n* is operating on J3. Consequently its task has not been completed. Therefore, during the Add cycle at the start of *t*11, since P*n* is not idle, the job J3 is not added to the bottom of Q2. As further seen, since at the start of *t*11 J3 is deleted from Q3 and since J3 was the only number in the queue at the start of *t*11 during the Assign Job cycle no job can be assigned to P3. Thus, during *t*11 P3 is idle. Then at the start of *t*12, P*n* is serviced by deleting J3 from its queue. Furthermore, P*n* indicates by means of its CCR that the job number deleted therefrom, i.e., J3, should be added to the bottom of Q2 if P3's task is done. Since in this situation P3 during *t*11 was idle, the conditions for adding J3 to the bottom of Q2 are met. Consequently, during the Add cycle at the start of *t*12 J3 is added to the bottom of the queue of Q2.

In all of the forgoing descriptions it has always been assumed that when a processor is serviced by the JC, the job number (JN) in the JNR of the PC of the processor is always deleted from the processor's queue during the Delete cycle. The deletion has always been assumed to be unconditional. That is, it has been assumed that the JN is always deleted during the Delete cycle even through the same JN, such as J4 in the example herebefore described in conjunction with time period *t*7 and FIG. 4, may be added to the queue of the processor which is being serviced during the Add cycle. As is appreciated by those familiar with the art and as previously briefly indicated, a situation may arise in which a processor may not be able to complete the performance of a task for a given job due at a particular situations or conditions existing at a particular time such as, for example, the lack of the presence of all the data words for the particular job in the high-speed memory, previously briefly referred to. In such a situation, it may be desirable to retain the job number in the processor's queue so that when the condition no longer exists the job will be in the queue and will eventually be assigned as a function of its location in the queue to the processor to enable the latter to complete its task for the job. However, in order to prevent the processor from being idle until the condition no longer exists, it is desirable to provide it with another job number in its queue without deleting the previous number therefrom. Thus it is desirable to be able to operate the JC to assign a new job to a processor without deleting the previous job from its queue. It may further be desirable to enable the processor to affect one or more of the flags in the JAF of the JQL word of a job number assigned thereto, so as to indicate that the particular job number is not assignable for one or more different reasons.

Figure 29:
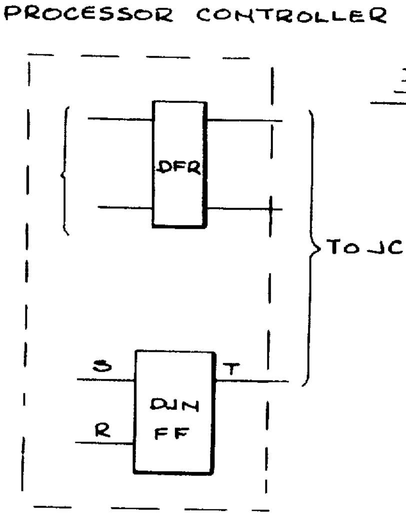
FIG. 29 is a simplified diagram of circuitry included in some embodiments in each processor controller.

In order to provide such capabilities in accordance with the teachings of the present invention, each processor controller (PC) may include, in addition to the various elements hereinbefore described in connection with FIG. 14, a Deactivation Flag Register (DFR) which is shown in FIG. 29 and a Deactivation Job Number (DJN) flip-flop, both of which are controlled by the processor associated with the particular PC. Briefly, each bit of the DFR is assumed to correspond to a different one of the bits or flags in the JAF field of a JQL word. By setting any of the bits of the DFR by the processor and thereafter transferring the states of the bits into the JAF, the assignability of the job number associated with the JQL word may be affected. The DJN flip-flop shown in FIG. 29 is assumed to be set by its processor to have a true output whenever the processor desires a new job number, yet does not want the previous number supplied thereto to be deleted from its queue.

Figure 30:
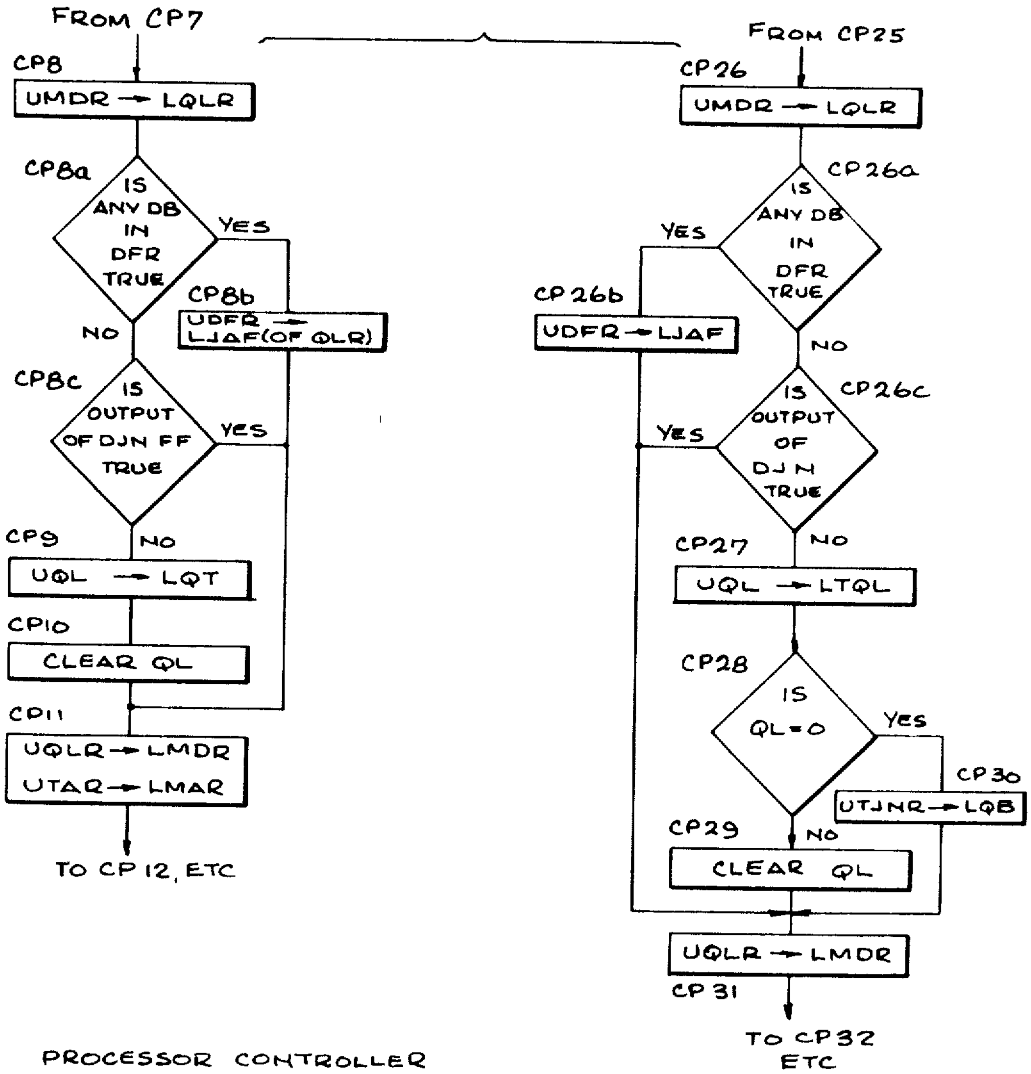
FIG. 30 is a flow chart exemplifying modifications in the basic Delete cycle of operation.

The manner in which the output of the DFR and the true output of the DJN flip-flop are used in order to control the JC's operation during the Delete cycle may best be explained in conjunction with FIG. 30 to which reference is made herein, and FIG. 20. FIG. 20 is the basic flow chart for the basic Delete cycle operation, while FIG. 30 represents, in flow chart form, the modifications which have to be made in the basic Delete cycle to inhibit the deletion of a job number from a processor's queue or to insert an assignment inhibit flag in the job number's JQL word.

As seen from FIGS. 20 and 30, if the job number previously supplied to the processor which is being serviced represents the top number in the queue, after CP8 and during CP8*a* the DFR of the processor which is being serviced is interrogated. As previously pointed out the processor may set any of the bits of the DFR to indicate that the job number previously supplied thereto should not be assigned as long as a particular set of conditions related to the particular bit of the DFR exists. Thus, during CP8*a*, if any of the DFR bits, hereafter referred to as a Deactivation Bit (DB) is true, the DFR is unloaded during CP8*b* and is loaded into the JAF of the QLR thereby setting the appropriate flags in the JAF of the QLR. After this step the sequence proceeds to return the JQL word in the QLR to memory by the steps performed during CP11. Therefrom the sequence proceeds with the performance of the basic Delete cycle.

If, however, during CP8*a* none of the DFR's bits is true, during CP8*c* the output of the DJN flip-flop is interrogated. If it is not true, thereby indicating that the job number should be deleted unconditionally, the sequence proceeds to the step to be performed during CP9 and the subsequent steps as in the conventional Delete cycle operation. If, however, the DJN flip-flop is true, thereby indicating that the job number should both be deleted from the queue, the sequence proceeds to restore the JQL word in memory by the steps performed during CP11.

Likewise, if the job number previously supplied to the processor is other than the top number in the queue, after the performance of the step during CP26 and DFR is interrogated during CP26*a*. Of any of its DB's is true, during CP26*b* the DFR is unloaded and loaded into the JAF of the QLR. Therefore the JQL word is restored during CP31 and the subsequent steps. If, however, during CP26*a* none none of the DB's in the DFR is true, the DJN flip-flop is interrogated during CP 26*c*. If it is false, thereby indicating that the job should be deleted unconditionally, the Delete cycle proceeds by performing the steps during CP27 and the following steps. If, however, the DJN flip-flop has been set to have a true output, thereby indicating that the job number should be deleted from the queue, the sequence proceeds with the performance of the step during CP31 and the subsequent steps.

It should be apparent to those familiar with the computer art and the interpretation of flow charts that in the foregoing described examples it is assumed that whenever any of the bits of the DFR is set to true, it indicates that the job number should not be deleted from the processor's queue and that the particular set bit is used to set a corresponding flag in the JAF of the JQL word of the particular job number. Also in the foregoing described examples, it is further assumed that even if none of the bits of the DFR is true, i.e., none of the flags in the JAF of a JQL word is effected thereby not effecting the subsequent assignment of the particular job number, the job number may nevertheless be retained in the processor's queue by merely setting the DJN flip-flop to have a true output. Clearly, if desired, the arrangement may be modified so that if a processor effects any of the flags in the JAF of the JQL word of a particular job number the particular job number is automatically deleted from the processor's queue.

It should be appreciated that the ability of a processor to control the various flags in the JAF of a JQL word of any job number assigned to it so as to effect the subsequent assignability of the job is highly desirable and significant. Each of the flags may be set upon the sensing of a different set of conditions or reasons by any processor to inhibit the subsequent assignment of the job number, as long as the conditions are in existence. The system as a whole may be operated to reset the various flags once the conditions no longer exist to enable the job to be thereafter assignable to the processor in whose queue the job number is located.

It should be pointed out that in a multiprocessor system in which the present invention is directed to be incorporated the various flags in the JAF may be used so that different combinations of one or more set flags may inhibit the assignment of the job numbers to one or more different processors while enabling the job number to be assigned to other processors. Such an arrangement would further enhance the advantages derived from the presence of the flags in the JQL word of each job number and their use in controlling the assignability of the job number to the various processors. However, of explanatory purposed, it may be assumed that herein as long as one or more of the flags in the JAF is true the particular job number is not assignable to any of the processors.

In the foregoing description it has been assumed the each processor has a separate queue for which jobs are assignable thereto. Such an arrangement is particularly applicable in a system in which each processor performs a different processing task, i.e., is of a different type. There are, however, many multiprocessor system applications in which it may be desireable to employ several processors of the same type. This is true whenever a particular processing task has to be performed more often than other tasks and a single processor performing such a particular task can not perform the tasks fast enough so as not to result in undue delays in completing the execution of the various jobs. In such a case a plurality of identical processors, all of which perform the same type processing task, are preferably employed.

Such identical processors of the same type may be serviced from their separate queues. However it is believed that a preferred arrangement is one in which all identical processors of the same type are serviced from a common queue. Thus, as defined herein, it is assumed that a single queue is formed for each processor type which may include more than identical processors. Each processor type is identified by a number as if the type consisted of a single processor. Jobs are added to the queue as herebefore described by providing the basic number of the type of processors rather than a processor's specific number. A job is deleted from the queue as herebefore described. The only changes in the aforedescribed JC basic operation which have to be implanted when a plurality of identical processors of the same type are serviced from a common queue, i.e., jobs are assigned thereto from a single queue, are changes in the Assign Job cycle.

The necessary changes may best be described in conjunction with FIG. 31 which is a simplified format diagram of a queue including JQL1 through JQL5, from which a pair of identical processors P*na* and P*nb* each of a processor type *n* are assumed to be serviced. In accordance with the teachings of the present invention, for the processor type *n* a PQ*n* word is included whose qt. and QB store respectively the job numbers of the top and bottom JN's in the queue.

As herebefore explained in conjunction with FIGS. 22 and 23, during the Assign Job cycle the PNCTR is used to control which of the processors is in communication with the JC. EAch processor is interrogated to determine whether it is busy. If it is not, either the top job number in its queue is assigned thereto (see FIG. 22), or the first assignable job number is assigned thereto. As hereinbefore assumed, a job number is assumed to be assignable only if all the flags in the JAF of its JQL word are false (see FIG. 23). In accordance with the teachings of the present invention, it is assumed that when the count in the PNCTR reaches n, representing a processor type which includes a pair of processors such as P*na* and P*nb*, an auxiliary bit of the PNCTR is set. As a result the first of the two identical processors, for example, P*na*, is in communication with the JC. If the P*na* is not busy the JC performs the Assign Job cycle thereby by assigning the top assignable job number thereto.

In the arrangement shown in FIG. 31 let it be assumed that for some reason JQL1 is not assignable due to a true F1 in its JAF, a true flag is represented by +. Let it further be assumed that JQL2 is assignable since none of its flags is true. In such a case the JC will assign job number 2 to processor P*na* as indicated by (2) under block P*na*. Thereafter the JC will interrogate P*nb* to determine whether it is busy. If P*nb* is not busy the queue will again be used to determine which of the job numbers can be assigned thereto. However, in order to insure that the same job number is not assigned to the two processors one of the flags, for example F2, is used whenever a job is assigned to one of the identical processors. Thus, when a next processor of the identical ones is serviced the true F2 inhibits the same job number from being assigned twice.

In the particular example, described herein in conjunction with FIG. 31, before the job number 2 is assigned to P*na* its flag F2 is set to true as indicated by (+) under F2 of JQL2. Consequently when P*nb* is serviced JN1 is not assigned thereto since F1 of JQL1 indicated that JN1 is not assignable. Similarly JN2 is not assignable since its F2 is true. In the particular example shown in FIG. 30, JN3 is similarly not assignable since its flag F*n* is indicated as being true. Consequently the first job number which may be assignable to P*nb* is JN4 even though it is the fourth job number in the queue. However, before completing the assignment of JN4 to P*nb*, F2 in JQL4 is set to true as indicated by (+) under JQL4, to indicate that JN4 has been assigned.

Although in FIG. 31 and the description connected therewith it has been assumed that processor type *n* includes only a pair of processors. P*na* and P*nb*, it should be appreciated that any processor type in the multiprocessor system in which the present invention is incorporated may include any number of identical processors. The only thing that is required from the JC is that during the Assign Job cycle when the number in the PNCTR represents the particular processor type, the various identical processors of the particular processor type are sequentially interrogate. For each of them which is found not to be busy the common queue is utilized to assign a job number thereto. A particular flag, for example F2, of the JQL word of the job number which is assigned to one of the identical processors is set to thereby inhibit the assignment of the same job to another one of the identical processors when the queue is used for assigning a job number thereto if the particular processor is not busy. It should be pointed out that since one the flags in each of the JAF's is used to indicate that the job number has been assigned to one of a group of identical processors, after the particular processor completes the performance of its task for the job number and the job number is subsequently deleted from the common queue, the particular flag such as F2 should be reset to enable the job number to be assigned to another processor which has to perform its task on the job number.

The manner in which JC services a plurality of identical processors of the same type, for example P*na* and P*nb* hereinbefore described, from a single queue, Q*n*, may be summarized in conjunction with FIG. 32. The latter diagrams in chart from the JC's operation at the start of each of four time periods *t*14 through *t*17. Let it be assumed that during t13, P2 which has a queue, Q2 which includes J3, J1, J5 and J4 operates on J3. P3 which has queue, Q3 which includes only J2, operates on J2. Let it be further assumed that P*na* and P*nb* being identical processors are served from a queue, Q*n*, which is empty. Consequently both P*na* and P*nb* are idle.

At the start of *t*14 P2 is assumed to request servicing, as a result of which J3 for which it previously performed its task is deleted from its queue, Q2. J3 is then added to Q*n*. Then during the Assign Job cycle, J1 from the top of queue Q2 is assigned to P2. Then J3 is assigned to P*na*. P*nb* remains idle since the queue Q*n* does not include another assignable job number.

At the start of *t*15, P2 is again assumed to request servicing as a result of which J1 is deleted from its queue and is added to the top of Qn. Consequently when the identical processors of the *n*-type, i.e., P*na* and P*nb*, are interrogated since P*b* was previously idle, J is assigned thereto. Thus the two job numbers J1 and J3 in Qn are separately operable by the identical processors P*nb* and P*na*, respectively. At the start of *t*16, during the Add cycle mode of operation of the JC, J5 is added to Qn. However, during the Assign Job cycle, since both P*na* and P*nb* are busy, this job, i.e., J5 remains at the bottom of the Q*n* awaiting further assignment. Then at the start of *t*17 P*na* is assumed to request servicing, as a result of which J3 previously assigned thereto is deleted from Q*n* and is added to the bottom of Q3. Then during the Assign Job cycle, since P*na* is found not to be busy, a job is assigned thereto. However, the job which is assigned thereto is not J1 at the top of Q*n* on which P*nb* is still performing its task. Rather, J5 at the bottom of Q*n*, the only assignable job number in Q*n*, is assigned to P*na*.

Herebefore, the basic three-cycle mode of operation of the JC representing a basic embodiment has been described in connection with the flow charts of FIGS. 20–22 while various modifications thereof representing other embodiments of the invention have been described in connection with other Figures which are also flow charts. As is appreciated by those familiar with the computer art to which the present invention is directed, a flow chart of the type used herein is basically a chart of a sequence of steps, each step involving very simple operations which are well known in the art. Some of the steps involve the unloading of a complete register or a field thereof and the loading of another register or a portion thereof. Other steps may involve the interrogation of a bit or a field of bits to determine which route to follow in the sequence. Still other steps involve reading out of a word from the RAM or the writing or storing of a word therein. As herebefore assumed, each step or a group of steps is assumed to be performed during a specific clock period, CP. It should be appreciated that various logic design techniques may be employed to define the various clock periods during each of which various control signals are produced to control the proper performance of each step to occur at its proper time in the sequence. Thus the foregoing described flow chart should be deemed to represent the hardware of the JC control unit 65 (FIG. 13) which, as herebefore explained, provides the necessary signals to the JC to control it to operate in accordance with the foregoing description.

Figure 33:
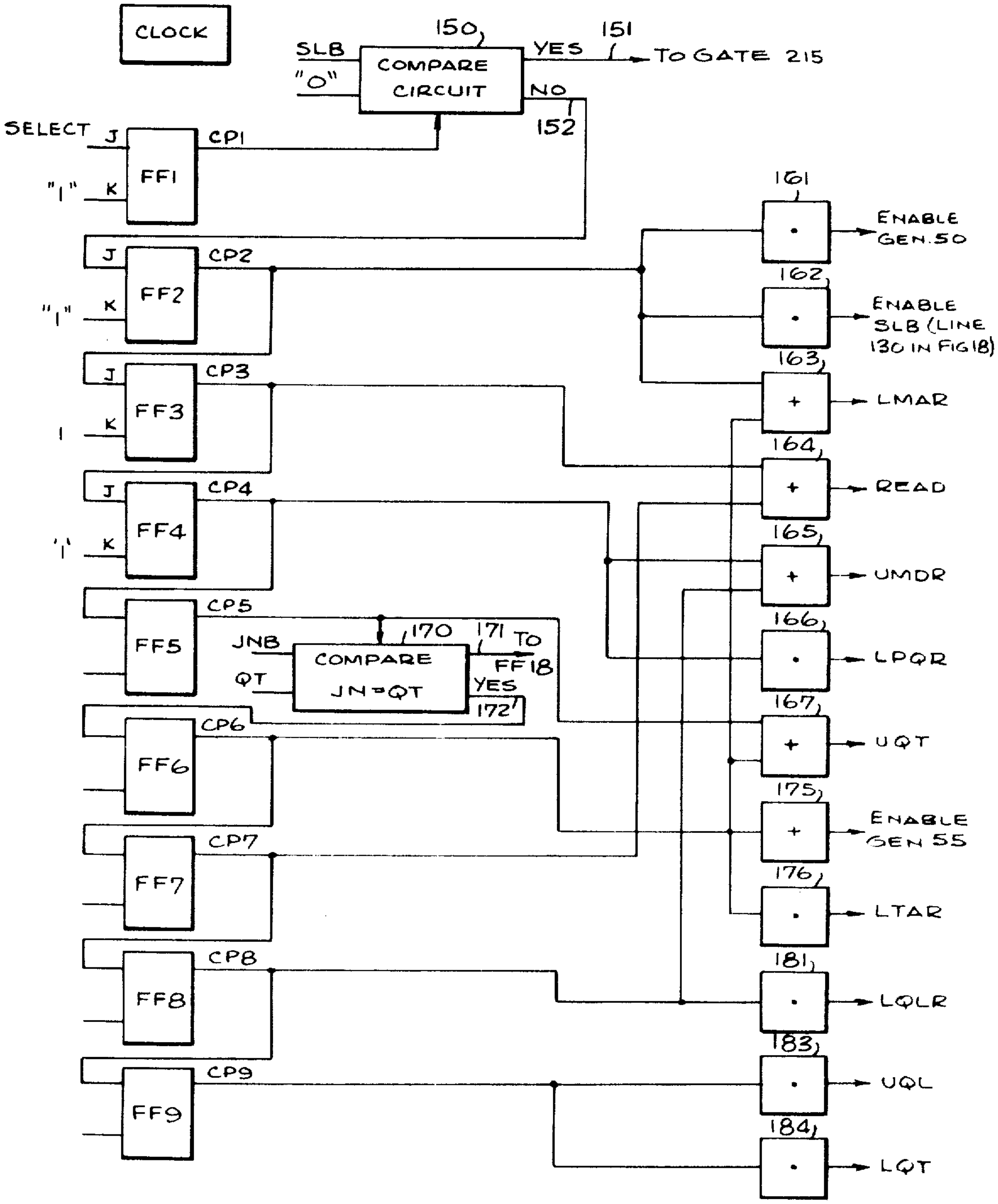
FIGS. 33 and 34 are logic diagrams of the circuits for producing control signals, which circuits may be employed in implementing the JC Control Unit 65 shown in FIG. 13.
Figure 34:
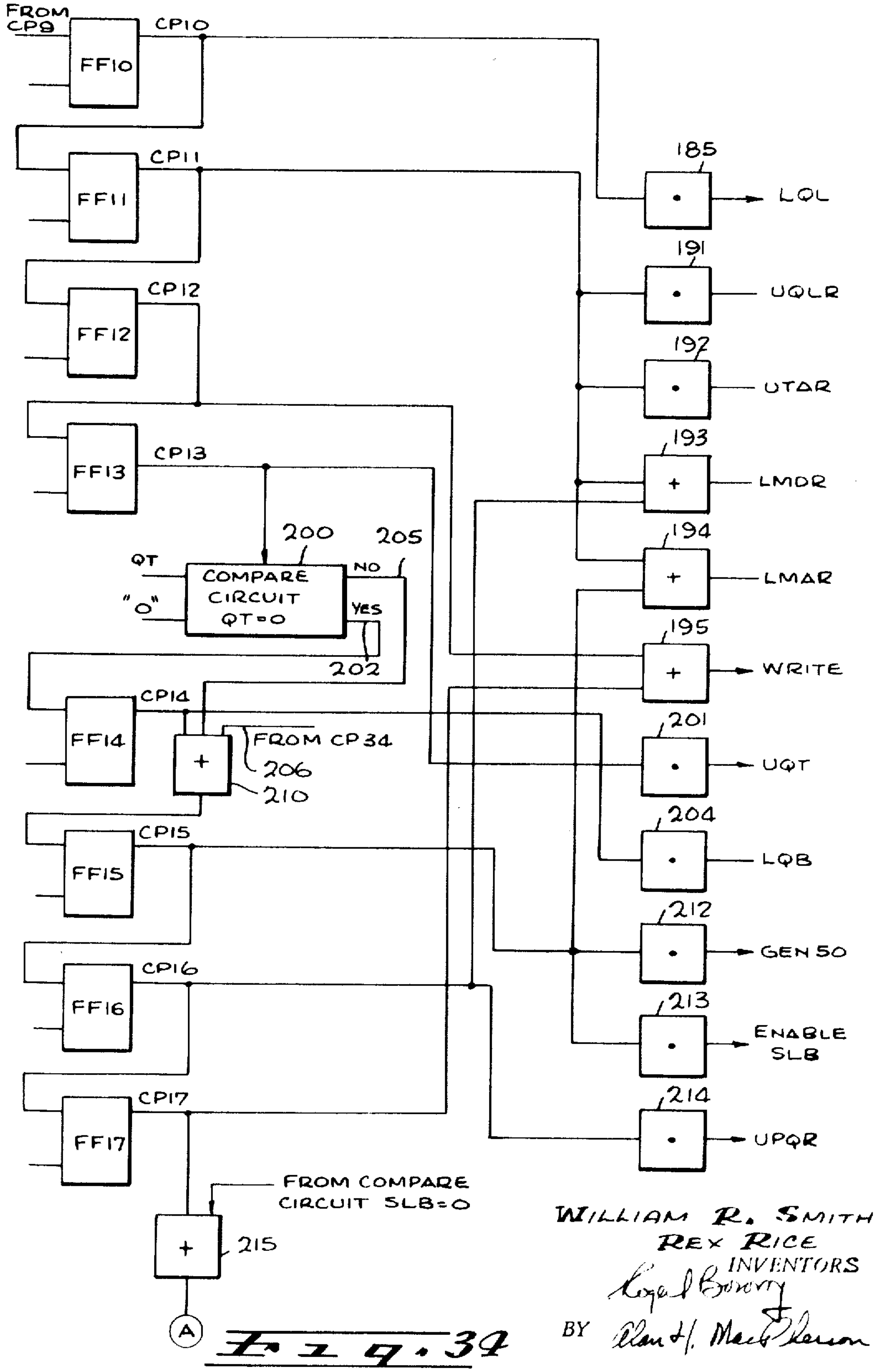

One example of a logic design technique which may be employed in implementing the JC control unit 65 will be described in conjunction with FIGS. 33–34 to which reference is now made. FIGS. 33–34 are diagrams of the logic circuits which produce various control signals for the performance of the steps during CP1–CP9 and CP10–CP17, respectively. It is submitted that from these Figures the logic circuits necessary to produce the control signals for the performance of the steps during control the other clock periods should be obvious and therefore their detailed description will not be included herein.

In FIGS. 33 and 34 conventional logic designation is employed. That is, a block with a dot in the center represents an AND gate, while a plus (+) sign in a block represents an OR gate. An input line with a little circle adjacent the block indicates that the inverted input is true and the various blocks designated FF are assumed to represent flip-flops of the JK type.

A JKFF is characterized by the following logical properties. If one assumes that $S_n$ is the state of the FF at clock period *n* and $S_{n+1}$ is the state of the FF during the following clock period, *n*+1, the following rules dictate the state of the FF as a function of the J K inputs.

| J | K | $S_{n+1}$ |
|---|---|---|
| 0 | 0 | $S_n$ |
| 0 | 1 | 0 |
| 1 | 0 | 1 |
| 1 | 1 | $S_n$ |

In FIGS. 33–34, K is always set to be a "1." With K set to "1" the FF will normally be "0." When the J becomes "1" the FF will change state for the next timing period and become a "1" when supplied with a clock pulse. This gives the basic Q*n* signal. While the FF is "1" the J input normally goes to the "0" state, causing the state of the FF to return to the "0" state during the next clock period.

As connected in the logic circuitry embodiment shown in FIGS. 33 and 34, 24 flip-flops are designated FF1–FF24, each one of which is designed to define a different, though equal, time or clock period, representing the period between two clock pulses. CP1 is defined by the period during which FF1 is a "1" or ON, CP2 the time period during which FF2 is ON, etc. It is during these defined time periods that the various steps required for the performance of a part of the Delete cycle are actually executed. The basic Delete cycle has been described in conjunction with FIG. 20 to which attention is again directed.

As previously explained in conjunction with FIG. 20, the three-cycle mode of operation of the JC starts when a Select signal is supplied thereto via line 126 (see FIG. 15), which indicates that a Need Service signal has been received from one of the processors. In the JC Control Unit 65, the line 126 providing the Select signal is connected to the J input of FF1 so that when the next clock pulse is received from the clock, shown in block form in FIG. 33, FF1 is a "1," defining the clock period CP1. The true output of FF1 is used to enable a compare circuit 150. Basically this circuit compares the number on the select bus (SLB) with a value "0" supplied thereto. If SLB is equal to zero, output line 151 is set to true. On the other hand, if SLB is not equal to zero, i.e., the results of the comparison is "NO" the output line 152 which is connected to the J input of FF2 is true.

Assuming that SLM ≠ 0 and therefore input line 152 is true, when the next clock pulse is received by all the flip-flops FF2 is set to be a "1" so that its output is true to define CP2. As seen in FIG. 20, during CP2 the generator 50 is enabled with the processor number of the SLB to generate the address of the PQ word of the processor. Also during this period the output of the address from generator 50 is loaded into the MAR.

In accordance with the particular logic arrangement shown in FIG. 33 the true output of FF2, during CP2 is supplied to three gates, two AND gates, 161 and 162 and an OR-gate 163. The output of AND-gate 161 is used to provide an enabling signal to generator 50 to provide the address of a PQ word in a manner as hereinbefore explained in conjunction with FIG. 18. The output of AND-gate 162 serves as an enabling signal for line 130, shown in FIG. 18, so as to enable the generator 50 to provide the address of the PQ word of the processor whose number is present in the SLB. Simultaneously therewith during CP2 the output of OR-gate 163 serves to activate the MAR to load the address supplied thereto via MAB 17 (see FIG 18). Hereafter, a load control signal will be designated by the nomeclature of a register or a field thereof, preceded by the prefix L, while a control signal necessary to unload a register or a field thereof will be represented by the register of the fields' nomenclature, preceded by the prefix U. Hereafter, various single input AND gates will be shown whose outputs are used as control signals assumed to be generated by the JC control unit 65. These gates are included to symbolize isolation gates between the unit 65 and the various registers or fields which the control signals are supposed to activate.

From the foregoing it is thus seen that FF2 together with gates 161 through 163 define the clock period CP2 and provide the control signals which are necessary to activate generator 50 to produce the address of a PQ as a function of the processor number in the SLB, as well as provide a load signal to the MAR. These are all the signals which are necessary for the performance of the step shown in FIG. 20 to occur during CP2. As seen in FIG. 33, the output of FF2 is connected to the J input of FF3 so that when the next clock pulse is supplied FF3 is ON, providing a true output which defines clock period CP3. As seen in FIG. 20, during CP3 only a Read operation is performed. Thus in FIG. 33 the output of FF3 is shown connected to activate an OR-gate 164 whose output represents a Read control signal which is assumed to be supplied to the RAM to perform a Read operation therein. After CP3, CP4 is defined by means of FF4 whose true output is supplied to two gates, an OR-gate 165 and an AND-gate 166. The output of OR-gate 165 is a Unload MDR (UMDR) control signal, while the output of AND-gate 166 is a Load PQR (LPQR) control signal. Thus during CP4 the MDR unloads the PQ word which is loaded into the PQR of the JC.

Following CP4, CP5 is defined by FF5 whose true output is supplied to enable a compare circuit 170 which is designed to compare the job number supplied thereto from the Job Number Bus (JNB) with the number in the QT field of the PQR. The true output of FF5 is also supplied to a gate 167 whose output causes the unloading of the QT field of the PQR so that the compare circuit 170 may compare the job number contained in the QT field with the job number in the JNB. If JNB is not equal to QT output line 171 of compare circuit 170 which is connected to FF18 is true. Consequently during the next clock pulse FF18 would be set to a "1" to define CP18, which as seen in FIG. 20, follows CP5 if JN is not equal to QT.

If, however, JN is equal to QT, output line 172 of compare circuit 170 is true. As a result, during the next clock pulse FF6 is set to a "1" to provide a true output which defines CP6. As seen from FIG. 20, during CP6 generator 55 is enabled to provide the address of the JQL word associated with the job number which is supplied thereto from the QT. This address is loaded into both the MAR and the TAR. To provide the control signals necessary to perform such a step, the true output of FF6 during CP6 is supplied to an OR-gate 175 whose output represents an Enable Generator 55 control signal. Also at the same time, the true output of FF6 is supplied to OR-gate 167 to unload the QT field of the PQR. The output of FF6 is also supplied to OR-gate 163 to provide a Load MAR (LMAR) and to AND-gate 176 whose output represents a Load TAR (LTAR) control signal.

After CP6, CP7 is defined by FF7 whose true output is supplied to OR-gate 164 to provide a Read control signal which is necessary since, as shown in FIG. 20, during CP7 a Read operation is assumed to be executed. Following CP7, CP8 is defined by FF8 whose true output is supplied to OR-gate 165 to provide a UMDR signal as well as to an AND-gate 181 whose output represents a Load QLR (LQLR) control signal. Thus during CP8 the MDR is unloaded and the QLR is loaded by the two control signals supplied by gates 165 and 181 during CP8.

Following CP8, FF9 defines CP9 during which the true output of FF9 is used to activate an AND-gate 183 to provide an Unload QL (UQL) control signal, and an AND-gate 184 which provides a Load QT (LQT) control signal. Following CP9, CP10 is defined (see FIG. 34). As seen from FIG. 20, during this clock period the QL field of the QLR is cleared. This may be accomplished by merely providing a Load QL (LQL) control signal without providing an Unload signal to any of the registers. As a result an all zero state is loaded into the QL field. As seen from FIG. 34 to which reference is made, the loading of QL is accomplished by means of a LQL control signal supplied by an AND-gate 185 which is activated during CP10, defined by a true output from FF10.

As seen from FIG. 34, CP11 is defined by FF11, during which the outputs of gates 191 through 194 are used to provide the four control signals necessary for the performance of the steps assumed to be performed during CP11. Likewise during CP12, which is defined by FF12, an OR-gate 195 provides a Write Control signal to cause the RAM to perform a Write operation. Following CP12, FF13 is set to be a "1" or ON to define CP13 during which a compare circuit 200 is activated to compare the job number supplied thereto from the QT field of the PQR with the number "0." During this same period, i.e., (CP13), an AND-gate 201 is activated to provide an Unload QT (UQT) control signal. Thus during CP13 the JN in QT is compared with the number "0."

If the two are equal, i.e., QT=0, a true output is provided on output line 202 of compare circuit 200 so that when the next clock pulse is supplied by the clock FF14 is set to a "1," to define CP14, which as seen from FIG. 20 is a period during which the QB field is cleared by providing a Load QB (LQB) control signal thereto. Thus during CP14 the true output of FF14 is used to activate a gate 204 to provide the LQB control signal. The output of FF14 as well as output line 205 of compare circuit 200 and a line 206 which is assumed to be connected to the output of a flip-flop 34, which defines CP34, are all connected to different inputs of a three-input OR-gate 210 whose output is connected to the J input of flip-flop 15. During any Delete cycle only one of the three inputs to OR-gate 210 may be true. Consequently FF15 can be driven to be a "1" to define CP15 after either CP14 or CP13 when line 205 is true, or after CP34 when input line 206 of OR-gate 210 is true. This is necessary since, as shown in FIG. 20, the steps to be performed during CP15 may have to follow those performed during either CP14 or CP13, the latter being the case if QT ≠ 0 or following CP34, as the case may be.

During CP15 an Enable Generator 50 control signal is provided by AND-gate 212 and an Enable SLB control signal is provided by AND-gate 213 to enable generator 50 to provide the address of a PQ word in memory corresponding to the processor whose number is in the SLB. At the same time, a Load MAR (LMAR) control signal is provided by OR-gate 194. During CP16 which follows CP15, an AND-gate 214 is enabled to provide a UPQR signal and at the same time OR-gate 193 is enabled to provide a LMDR control signal. CP16 is followed by CP17 during which a Write control signal is provided by enabling OR-gate 195. As shown in FIG. 34 the output of FF17 which is true during CP17 as well as line 151 of compare circuit 150 (see FIG. 33) are connected to two inputs of a two-input OR-gate 215, whose output when true represents the end of the basic Delete cycle operation. This is the case since, as seen from FIG. 20, the end of the Delete cycle represented by Ⓐ occurs either at the end of period CP17 or whenever during CP1 SLB is found to be equal to zero, as a result of which the output line 151 of the compare circuit 150 is true.

From the foregoing description of FIGS. 33 and 34 it should thus be appreciated that each of the clock periods shown in the various flow charts (such as CP4 in FIG. 20) may be assumed to represent a flip-flop which has a true output during a time period which defines the clock period. This true output is used to activate one or more gates, each one of which provides a control signal which is used to control the performance of one or more of the steps which are assumed to be executed during the particular clock period. For example, during CP4 the steps of unloading the MDR and loading the PQR, shown in FIG. 20, are assumed to represent two gates which provide UMDR and LPQR control signals in order to perform the necessary step. Likewise, each of the interrogation steps during which numbers are compared, such as the interrogations performed during CP1, CP5 and CP13, may be assumed to represent a compare circuit with two output lines. If the two numbers which are compared by the compare circuit are the same, i.e., the comparison result is an affirmative one or YES, one of the output lines is true to control the subsequent step to be performed. On the other hand, if the two numbers do not compare, i.e., the comparison result is negative or NO, the other output line of the compare circuit is true to define another subsequent clock period.

Although the logic circuits shown in FIGS. 33 and 34 define only CP1 through CP17 and generate the various control signals necessary for the performance of the steps to be performed during these clock periods as well as to perform various interrogations, it is appreciated that an identical technique with analogous flip-flops and compare circuits and output gates may be utilized to implement the other clock periods and generate the required control signals to perform the other steps as described in FIG. 20 and in the other flow charts herebefore explained. Thus the rest of the logic circuitry will not be described, it being assumed that the various clock periods and steps shown in the various flow charts are representative of actual logic circuits or hardware capable of generating the necessary control signals so that the various steps are performed in the necessary sequences, as hereinbefore explained.

From the foregoing description it should thus be appreciated that in accordance with the teachings of the present invention a Job Controller (JC) is provided for use in a time-shared multiprocessor system to control the execution of each job which may be requested from the system by any one of a plurality of sources. The execution of each job is assumed to involve the processing task of at least one of the processors of the system. The performance of the JC may be viewed either from the job point of view or from that of the processors of the system. Viewed from a job point of view, the JC controls the task flow for each job among a set of processors of different types until the job's execution is completed. Viewed from a processor's point of view, the JC controls the task assignment to each processor for a plurality of jobs requiring the performance of its task. Alternately stated, the JC monitors the operation of each processor, assigning a job number thereto from a list or queue of job numbers which require the processors' task, upon sensing that the processor is not busy and is in condition to receive a job number.

In embodiments in which several identical processors of the same type are included, the JC controls the assignment of job numbers of the like processors from a single queue to enable the various like processors to perform their tasks for the various jobs which need their services.

The basic function of the JC is performed by means of its special synchronizing hardware rather than as a result of lists of instructions of special purpose programs, as is the case in the prior art. Basic to the JC's operation is the use of a plurality of control words which are storable in a Random Access type memory, which may be assumed to form part of the JC. The control words include a Processor Control (PC) word for each processor type, each type being identifiable by a separate indicium, such as a number. The PC words are stored in cells whose addresses are capable of being generated by means of special purpose generators in the JC as a function of the processors' numbers. The control words further include at least one pair of words for each job to be performed by the system, where each job is likewise identifiable by a different number. One of the pair of words represent a Job Queue Link (JQL) word. The JC operates on various fields of the PC and JQL words to form a separate queue of job numbers or jobs for each processor type where the queue includes all the job numbers which are at any time in need of the services of the particular processor type. Each queue is represented by the contents of selected fields of the JQL words associated with the various jobs in the queue. The PC word of each processor type is used to contain the numbers of the top and bottom jobs in the queue of its associated processor type.

In accordance with the teachings of the present invention, it is assumed that when a processor completes the performance of its task for a job whose number has been previously assigned thereto it supplies a Needs Service (NS) signal to the JC. Task completion is assumed to include actual completion of the task as well as the processor's inability to complete the performance of a task for reasons which do not form part of this invention. Upon sensing that a processor needs servicing the synchronizing hardware of the JC automatically enters the execution of a three-cycle mode of operation.

During the first cycle, herebefore referred to as the Delete cycle, the JC deletes the job number previously assigned to the processor being serviced unless special signals are received therefrom to inhibit the deletion of the job number.

The JC, which is assumed to include all the Processors' Controllers (PC's) herebefore described, includes a Completion Code Register (CCR) for each processor. The processor before requesting servicing is assumed to use its corresponding CCR to supply the JC with the number of the next processor to whose queue the job number previously supplied thereto should be added. The content of the CCR is also used to provide an indication whether the addition should be made to the top or bottom of the queue of the next processor, as well as whether the addition should be made only if certain conditions are met. Furthermore, as hereinbefore explained, in some embodiments of the invention each processor may indicate that the job number should be added to the queues of more than one processor, for example two. In such a case a pair of control words are required for each job for each of the processors to which the job may be added. During the second cycle of operation of the JC the content of the CCR of the processor which is being serviced is utilized and the job number is added to the queue or queues of one or more processors, as the case may be.

The deletion of a job number from a queue, as well as its addition to another queue, is performed by the special synchronizing hardware of the JC by operating and modifying the contents of the PC and JQL words. The JC's hardware includes a plurality of registers which are used to temporarily store or hold selected control words which are read out from the memory in response to control signals supplied by the JC.

Various fields of the control words are then modified and thereafter restored in the memory at their fixed related addressable cells or addresses.

After completing the second cycle of operation hereinbefore referred to as the Add cycle, the JC automatically enters the performance of its third cycle which was hereinbefore referred to as the Assign Job cycle. During the latter, each of the processors is sequentially interrogated to determine whether it is busy or not. Each processor which is not busy has a job assigned thereto from the queue associated with its type. In the embodiments in which assignment is not conditional, the top job number in the queue is assumed to be assigned to each nonbusy or idle processor. However in those embodiments in which the assignment may be conditional, as indicated by the status of various flags in the job numbers JQL word, the top job in the queue which is in condition to be assigned is assigned to its corresponding nonbusy processor. After completing the interrogation of each one of the processors during the Assign Job cycle the JC's operation is automatically completed and the JC is in condition to service another processor. If at any time two processors request servicing at the same time the one of the higher priority is the first to be serviced.

As previously explained in detail, the JC's operation may be controlled to enable a processor to receive a new job number without having the previous number deleted from its queue, i.e., deactivate the job number deletion. Such a capability is particularly desirable if for some reason a processor cannot complete the performance of its task for a job assigned thereto, yet wants to retain the job in its queue so when the reason no longer exists the job may be reassigned to it to complete the task therefor. During the Add cycle a job may be added to one or more processors, depending on the embodiment employed, and the addition to either or both may be made conditional upon the presence of one or more sets of conditions which must be met. Furthermore, the JC may be implemented so that a separate queue exists for each processor regardless of type, which may be assumed as the basic embodiment. On the other hand, the JC may be embodied so as to include a separate queue for each processor type so that all identical processors of the same type may be serviced from a single queue.

It is appreciated that those familiar with the art may make other modifications and/or substitute equivalents in the arrangements as shown without departing from the true spirit of the invention.

What is claimed is:

1. In a multiprocessor system of the type including a plurality of processors of different types, identical processors of the same type performing identical processing tasks, said system being further of the type adapted to receive requests for the performance of jobs, each job being of the type requiring the processing task of at least one of said processors, a job controller for controlling the performance of said jobs by said processors, said job controller comprising:

a single set of logic, register and timing means for establishing one or more queues for a series of tasks to be performed by each of said plurality of said processors; and additional logic, register and timing means coupled to said single set of logic, register and timing means for adding to, modifying, or deleting from the sequence of said tasks in said queues for any of said processors.

2. The system of claim 1 further including additional register, logic and timing means within said job controller to interrupt the operation of any of said processors in response to an external signal indicating the need for such an interruption.

3. The system of claim 1 further including additional register, logic and timing means within said job controller to respond to a request for service from any of said processors and to provide such service.

4. The system of claim 1 further characterized by more than one processor using a single queue established by said controller.

5. For use in a system of the type including a main memory adapted to store multidigit words including control words in separate addressable cells, a plurality of processors each one of which is operable to perform a specified task on words supplied thereto, at least some of said processors performing different tasks, said system being further of the type which is in communication through input-output means with a plurality of data sources, each source being adapted to supply said system with data words for use in performing a requested processing job involving a task of at least one of said processors, a job controller for controlling the job performance comprising:

a selected plurality of addressable cells for (1) storing a processor-controlled word for each processor in a cell whose address is a function of a processor-identifying indicium and (2) storing a separate, first job-control word for each multitask job requested by a source, each job-control word including at least one field containing an indicium identifying one of said jobs; and logic register and timing means adapted to communicate with said plurality of processors, said logic means including a first means to address any cell of said selected plurality of addressable cells and a second means to control the contents of the processor-control words and various ones of said first job-control words so as to define a separate queue for each processor, each separate queue including the first job-control words of the various jobs.

6. The arrangement as recited in claim 5 wherein said logic means includes means responsive to a complete-task signal from one of said plurality of processors, indicating the completion of the processor's task for a job previously supplied thereto for modifying the processor's queue by modifying the content of at least one field of one of said job-control words.

7. The arrangement as recited in claim 6 wherein each first job-control word associated with a selected job in a queue contains the indicium of a succeeding job in the same queue, and a field of said processor-control word contains the indicium of the top job in said same queue, and wherein each first job-control word further includes a flag field for indicating the assignability of the job associated with the word, and wherein said means responsive to a complete-task signal further includes means for modifying the flag field of the first job-control word associated with the job previously supplied to the processor supplying said complete-task signal so as to inhibit the assignment of said job to any of said processors under predetermined conditions.

8. The arrangement as recited in claim 5 wherein said logic means includes means for determining whether each of said plurality of processors is in condition to have a job supplied thereto, and wherein said logic means further includes means for utilizing the queue of a processor in condition to have a job supplied thereto in the assignment of a job thereto.

9. The arrangement as recited in claim 8 including means in said logic means for assigning jobs to identical processors, which are in condition to have jobs supplied thereto, from a common queue.

10. The arrangement as recited in claim 8 wherein each first job-control word associated with a selected job in a queue contains the indicium of a succeeding job in the same queue, and a first field of said processor-control word contains the indicium of the top job in said same queue, and wherein said logic means includes means for assigning to each processor which is in condition to have a job supplied thereto the job whose indicium is contained in the first field of the processor's processor-control word.

11. The arrangement as recited in claim 10 further including means in said logic means for assigning from a common queue jobs to identical processors which are in condition to have jobs supplied thereto.

12. The arrangement as recited in claim 8 wherein each first job-control word associated with a selected job in a queue contains the indicium of a succeeding job in the same queue and a first field of said processor-control word contains the indicium of the top job in said same queue, and wherein each first job-control word further includes a flag field for indicating the assignability of a job, and wherein said logic means includes means for interrogating the flag fields of the first job-control words in a queue to assign to each processor which is in condition to have a job supplied thereto the first assignable job from the top of the queue.

13. The arrangement as recited in claim 12 further including means in said logic means for assigning jobs to identical processors, which are in condition to have jobs supplied thereto, from a common queue.

14. The arrangement as recited in claim 5 wherein said logic means include means for detecting a completion code from any processor which has completed its task for a job previously assigned thereto, said completion code indicating at least one next processor which is to perform a task on said previously assigned job; and job-adding means in said logic means for utilizing said completion code to add said previously assigned job to a queue of said next processor.

15. The arrangement as recited in claim 14 wherein each first job-control word associated with a selected job in a queue contains the indicium of a succeeding job in the same queue, and a first field of said processor-control word contains the indicium of the top job in said same queue, said completion code further providing an indication of the location in said next queue of said next processor to which said previously assigned job is to be added, and said job-adding means including means for adding said previously assigned job to said next queue of said next processor at said location in said next queue defined by said indication of said location in said next queue of said next processor.

16. The arrangement as recited in claim 15 wherein said completion code indicates that the addition should be performed only if selected conditions defined by said completion code exist, and said job-adding means includes logic, comparison, and register means for determining the existence of said selected conditions and for controlling the job addition only if said selected conditions are met.

* * * * *